US012700170B2

(12) United States Patent
Kawakami et al.

(10) Patent No.: US 12,700,170 B2
(45) Date of Patent: Aug. 4, 2026

(54) IMAGE GENERATION METHOD AND COMPUTER-READABLE MEDIUM

(71) Applicant: CELSYS, INC., Tokyo (JP)

(72) Inventors: Yosuke Kawakami, Tokyo (JP); Tetsuro Shimada, Tokyo (JP)

(73) Assignee: CELSYS, INC., Tokyo (JP)

( * ) Notice: Subject to any disclaimer, the term of this patent is extended or adjusted under 35 U.S.C. 154(b) by 73 days.

(21) Appl. No.: 18/749,625

(22) Filed: Jun. 21, 2024

(65) Prior Publication Data

US 2024/0346743 A1      Oct. 17, 2024

Related U.S. Application Data

(63) Continuation of application No. PCT/JP2022/030471, filed on Aug. 9, 2022.

(30) Foreign Application Priority Data

Dec. 22, 2021     (JP) ................................. 2021-208810

(51) Int. Cl.
　　　*G06T 15/20*　　　(2011.01)
　　　*G06T 19/00*　　　(2011.01)
(52) U.S. Cl.
　　　CPC ............ *G06T 15/20* (2013.01); *G06T 19/003* (2013.01); *G06T 2210/04* (2013.01); *G06T 2210/62* (2013.01)
(58) Field of Classification Search
　　　CPC ... G06T 15/20; G06T 19/003; G06T 2210/04; G06T 2210/62

(Continued)

(56) References Cited

U.S. PATENT DOCUMENTS

| | | | |
|---|---|---|---|
| 2017/0192637 A1* | 7/2017 | Ren ..................... | G06F 3/04817 |
| 2019/0208179 A1* | 7/2019 | Kasahara ............. | H04N 21/816 |

(Continued)

FOREIGN PATENT DOCUMENTS

| | | |
|---|---|---|
| JP | 2003-308344 A | 10/2003 |
| JP | 2005-122680 A | 5/2005 |

(Continued)

OTHER PUBLICATIONS

[Free Assets] You can see the beautiful scenery on the other side through the portal! The interesting portal system "World Portal System" allows you to teleport to another place by going through the door like "Anywhere Door", Unity AssetStore Summary, Hatena Blog, https://www.asset-sale.net/entry/World_Portal_System, Jun. 4, 2019, 22p.

(Continued)

*Primary Examiner* — Hai Tao Sun
(74) *Attorney, Agent, or Firm* — HAUPTMAN HAM, LLP

(57) ABSTRACT

An image generation method of generating an image in which three-dimensional virtual spaces are captured from a virtual camera arranged at a virtual position of a user or in a periphery of the virtual position of the user, includes: identifying a first virtual space to which the user belongs; identifying one or a plurality of second virtual spaces to be an image capturing target among the virtual spaces to which the user does not belong; generating an image in which an object present in the first virtual space is captured by the virtual camera by a first image generation method; and generating an image corresponding to an image in which an object present in the second virtual space is captured by the virtual camera by a second image generation method.

8 Claims, 27 Drawing Sheets

(58) Field of Classification Search
USPC ......................................................... 345/419
See application file for complete search history.

(56) References Cited

U.S. PATENT DOCUMENTS

| | | |
|---|---|---|
| 2019/0287495 A1 | 9/2019 | Mathur et al. |
| 2020/0084431 A1 | 3/2020 | Kato |
| 2021/0035356 A1* | 2/2021 | Castaneda ............. G06T 15/506 |

FOREIGN PATENT DOCUMENTS

| | | |
|---|---|---|
| JP | 2018-106643 A | 7/2018 |
| JP | 2019-175323 A | 10/2019 |
| JP | 2021-060789 A | 4/2021 |
| KR | 10-2019-0138896 A | 12/2019 |
| KR | 10-2020-0091256 A | 7/2020 |
| WO | 2017187821 A1 | 11/2017 |

OTHER PUBLICATIONS

Joost Van Dongen, "Interior Mapping—A new technique for rendering realistic buildings", https://www.proun-game.com/Oogst3D/CODING/InteriorMapping/InteriorMapping.pdf, 2008, pp. 1-8, 8pp.
Daniel Cohen-Or et al., A Survey of Visibility for Walkthrough Applications, IEEE Transactions on Visualization and Computer Graphics, Jul.-Sep. 2003, pp. 412-431, XP-002383736, vol. 9, No. 3, 21pp.

* cited by examiner

START

S1302

WHEN USER MOVES FROM FIRST VIRTUAL SPACE TO SECOND VIRTUAL SPACE AND THIS CAUSES SECOND VIRTUAL SPACE TO BECOME NEW FIRST VIRTUAL SPACE AND FIRST VIRTUAL SPACE TO BECOME NEW SECOND VIRTUAL SPACE, GENERATE IMAGE IN WHICH OBJECT PRESENT IN VIRTUAL SPACE THAT HAS BECOME NEW FIRST VIRTUAL SPACE IS CAPTURED BY VIRTUAL CAMERA, BY FIRST IMAGE GENERATION METHOD, AND GENERATE IMAGE CORRESPONDING TO IMAGE IN WHICH OBJECT PRESENT IN VIRTUAL SPACE THAT HAS BECOME NEW SECOND VIRTUAL SPACE IS CAPTURED BY VIRTUAL CAMERA, BY SECOND IMAGE GENERATION METHOD

END

| MOVEMENT PATTERN 1 | | | |
|---|---|---|---|
| No. | MOVEMENT | POSITION AFTER MOVEMENT | LANDSCAPE OF ENTRANCE |
| ① | START | STAGE C | DARKNESS |
| ② | EXIT A | STAGE A | STAGE C |
| ③ | ENTRANCE | STAGE C | STAGE A |
| ④ | EXIT B | STAGE B | STAGE C |
| ⑤ | ENTRANCE | STAGE C | STAGE B |

IMAGE GENERATION METHOD AND COMPUTER-READABLE MEDIUM

CROSS REFERENCE OF RELATED APPLICATION

This application is a continuation of International Application Serial No. PCT/JP2022/030471, filed on Aug. 9, 2022, which claims priority to Japanese Patent Application No. 2021-208810, filed on Dec. 22, 2021. The contents of these applications are incorporated herein by reference in their entirety.

BACKGROUND

Technical Field

The present disclosure relates to an image generation method and an image generation program.

Background Art

There is a technique that causes a user to perceive an image as if the user is in a virtual space and that allows the user to experience virtual reality through the visual sense of the user and the like.

For example, an existing technique provides an image processing system that includes a target object with a three-dimensional shape arranged in an actual environment perceivable by the user, the image processing system including image recognition information in which an image corresponding to the target object with the three-dimensional shape is arranged on the target object in association therewith and an image processing program that recognizes the image recognition information and lays the image over the target object. Moreover, this existing technique further includes a recognition unit that recognizes the image recognition information, and the image processing program changes a degree at which the image recognition information of the target object is made transparent, depending on a distance between the recognition unit and the image recognition information in the case where the image is laid over the target object (For example, see Patent Literature 1).

Moreover, in another existing technique, an image of a virtual space through the virtual camera is provided in which a landscape beyond a door is visible through the door. When this virtual camera passes through the door, an image of another virtual space is captured by the virtual camera (for example, see Non-Patent Literature 1).

Moreover, interior mapping is known as a method of rendering an interior (floor, ceiling, and wall) of a building without modeling (for example, see Non-Patent Literature 2).

If many doors used for movement of the user are provided in the virtual space, problems such as the user becoming uncertain about which door is connected to which room occur.

Particularly, in techniques relating to metaverse using current XR techniques, a simulated world extending over a widespread area tends to be built, and a problem of the user getting lost is noticeable.

Moreover, for example, when the user can move between multiple rooms through doors, it is preferable to enable visualization of areas beyond the doors to clarify which door is connected to which room. However, if the adjacent room is rendered through the door every time, load of processing of the rendering is very large, and phenomena such as reaction delay occur. Thus, the virtual space becomes an environment not enjoyable for the user.

CITATION LIST

Patent Literature

Patent Literature 1: Japanese Patent Application Publication No. 2021-60789

NON-PATENT LITERATURES

Non-Patent Literature 1: "[Free Asset] Landscape on the other side is clearly visible beyond the portal! Portal system that allows teleportation to another location by passing the door like "Anywhere Door" is interesting "World Portal System" ", https://www.asset-sale.net/entry/World_Portal_System (accessed Dec. 20, 2021)
Non-Patent Literature 2: Joost van Dongen "Interior Mapping-A new technique for rendering realistic buildings", https://www.proun-game.com/Oogst3D/CODING/InteriorMapping/InteriorMapping.pdf (accessed Dec. 20, 2021)

SUMMARY

An object of the disclosed technique is to save a memory capacity and resources such as a calculation amount of a computation processing apparatus (processing unit) that are required to obtain a two-dimensional image based on three-dimensional virtual spaces. Note that the computation processing apparatus includes a CPU and a GPU.

Means for Solving the Problem

The disclosed technique provides an image generation method of generating an image in which three-dimensional virtual spaces are captured from a virtual camera arranged at a virtual position of a user or in a periphery of the virtual position of the user, the image generation method including: identifying a first virtual space to which the user belongs;
    identifying one or a plurality of second virtual spaces to be an image capturing target among the spaces to which the user does not belong; generating an image in which an object present in the first virtual space is captured by the virtual camera, by a first image generation method; and generating an image corresponding to an image in which an object present in the second virtual space is captured by the virtual camera, by a second image generation method.

Moreover, the disclosed technique provides an image generation method of generating an image in which three-dimensional virtual spaces are captured from a virtual camera arranged at a virtual position of a user or in a periphery of the virtual position of the user, the image generation method comprising:
    identifying a first virtual space to which the user belongs;
    identifying one or a plurality of second virtual spaces to be an image capturing target among the virtual spaces to which the user does not belong;
    generating a first partial image of the image by a first image generation method, the first partial image being an image in which an object present in the first virtual space is captured by the virtual camera; and
    generating a second partial image of the image by a second image generation method, the second partial image corresponding to an image in which an object present in the second virtual space is captured by the virtual camera, wherein the second image generation method is an image generation method that consumes less calculation resources than the first image generation method, in calculation required to generate the image corresponding to the object, the image generation method further comprising, when the user moves from the first virtual space to the second virtual space and this movement causes the second virtual space to become the new first virtual space and the first virtual space to become the new second virtual space, generating a new image including a third partial image in which the object present in the virtual space that has become the new first virtual space is captured by the virtual camera and a fourth partial image corresponding to an image in which the object present in the virtual space that has become the new second virtual space is captured by the virtual camera, by generating the third partial image by the first image generation method and generating the fourth partial image by the second image generation method.

Furthermore, the disclosed technique provides a program that causes a computer to execute the above-mentioned image generation method and a medium in which the program is stored.

According to the disclosed technique, it is possible to save a memory capacity and resources such as a calculation amount of a computation processing apparatus (processing unit) that are required to convert three-dimensional virtual spaces to a two-dimensional image.

BRIEF DESCRIPTION OF THE DRAWINGS

FIG. 13 illustrates a flow of switching an image generation method in the case where the user moves from one virtual space to another.

FIG. 19 is a diagram in which texture data for polygons 1820 of five planes is created by performing projection from the center 1841 of a cube CUI to the polygons 1820 of the five planes by using a cube map that uses the cube CUI and that has been already explained in FIG. 14 and the like.

DETAILED DESCRIPTION

There is a technique for obtaining an image of three-dimensional spaces captured from a virtual camera to visualize objects present in three-dimensional virtual spaces. For example, the three-dimensional virtual spaces can be converted to an image by calculating a color of light (including intensity of light. The same applies hereinafter in the present description) reaching an imaging surface from the object through a lens of the virtual camera, for each pixel of the imaging surface. Various rendering techniques are present as such a technique.

When a computer calculates the color of light reaching the imaging surface pixel by pixel based on the three-dimensional virtual spaces and executes rendering, a memory tends to be insufficient in a general computer, and problems such as rendering delay occur.

Particularly, in current computer graphics, an increase in the number of polygons used in a three-dimensional object is significant, and the problem of rendering delay is notable. Moreover, ingenuities for reducing a rendering load are particularly necessary in gaming consoles, smartphones, and the like that are hardware having a limited processing performance and a limited memory amount and used over a relatively-long period.

Moreover, in devices such as an HMD (head mounted display) that is worn on the head to allow a user to experience virtual reality, two images for the right eye and the left eye are generated for stereovision. In order to obtain multiple images that allow the user to experience virtual reality as described above, even-finer multiple images need to be generated. Along with an increase in fineness of a display device, a required fineness of an image and a dynamic range have also increased. The number of pixels and an information amount necessary for forming an image have also increased.

Accordingly, an object of the disclosed technique explained below is to appropriately assign limited hardware resources to rendering of an object in generation of an image.

Moreover, an object of the disclosed technique is to reduce consumption of hardware resources for obtaining an image corresponding to rendering of objects present in three-dimensional virtual spaces.

For example, efficiently rendering an image through a door by using saved resources causes a user to be less likely to be lost while the user is moving in the three-dimensional virtual spaces.

An embodiment is explained below by using the renderings. The embodiment illustrates an example of the technique defined in the scope of claims, and does not limit the disclosure.

Figure 1A:
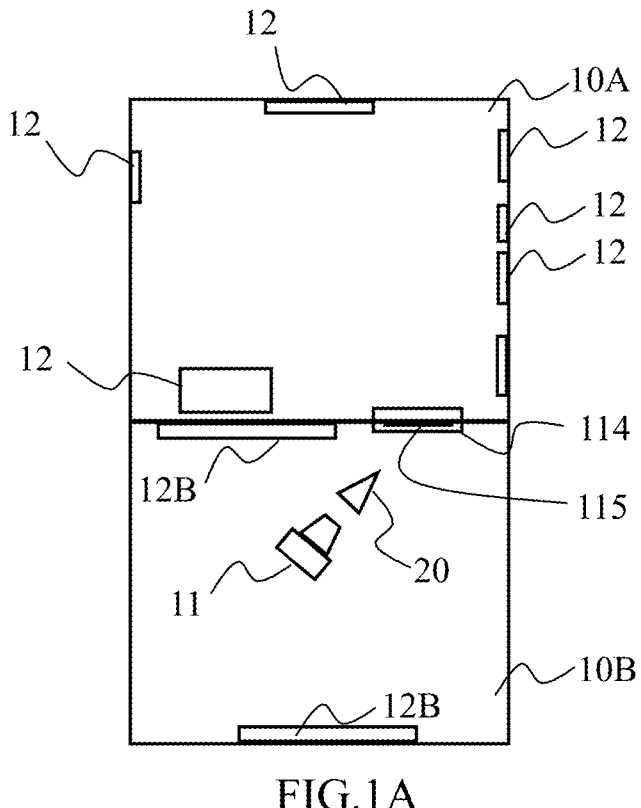
FIG. 1A illustrates an image 100 in which multiple objects 12 present in a room 10A that is a three-dimensional virtual space is captured through a glass 115 by a virtual camera 11 arranged behind a user 20A present in a room 10B that is a virtual space different from the room 10A.

In FIG. 1A, multiple objects 12 present in a room 10A that is the three-dimensional virtual space are captured through a glass 115 by a virtual camera 11 arranged behind a user 20 present in a room 10B that is a different virtual space from the room 10A.

Figure 1B:
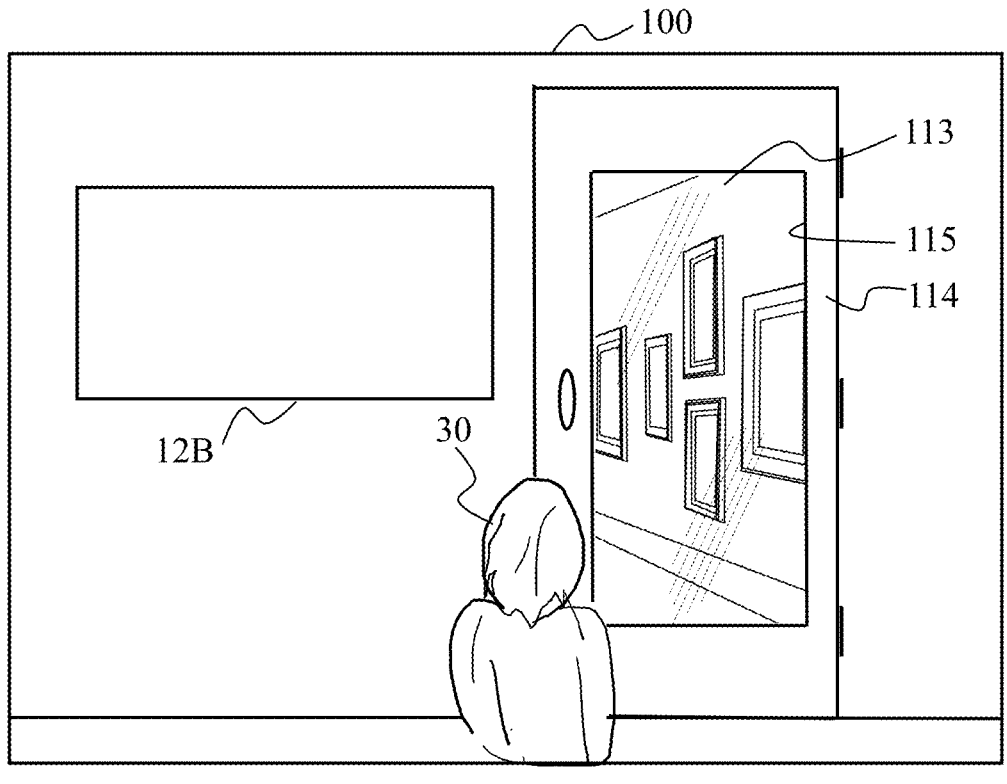
FIG. 1B illustrates the image 100 in which the three-dimensional virtual spaces 10A and 10B are captured by the virtual camera 11.

FIG. 1B illustrates an image 100 in which the three-dimensional virtual spaces 10A and 10B are captured by the virtual camera 11. The image 100 includes an image of an inner wall of the room 10B, a door 114, a periphery of the door 114, and a back shot of a character 30 corresponding to the user 20.

An image 113 rendering the inside of the room 10A through the glass 115 of the door 114 is visible in the image 100.

For example, assume that a three-dimensional model of the room 10A and the multiple objects 12 present in the room 10A are formed of multiple polygons. In this case, in order to generate the image 100 captured in the virtual camera 11, a color of light reaching each pixel of an imaging element of the virtual camera from the multiple objects 12 formed of multiple polygons through a lens of the virtual camera is calculated. An operation of generating this image 100 is referred to as, for example, rendering.

In order to generate an image of a view through the glass 115 of the door 114 by rendering, for example, light reaching the imaging element from the multiple objects 12 in the room 10A via the lens of the virtual camera 11 by passing through the glass 115 present in the door 114 is identified. To this end, it is necessary to calculate whether a light beam is a light beam passing the glass 115 or a light beam unable to pass the glass 115 and blocked by a wall between the room 10A and the room 10B, as a matter of course. Such calculation is performed for all objects 12, and one image is generated. Accordingly, when the number of objects 12 is large or the objects 12 are complex, a large amount of calculation resources are necessary even for calculation of one image. Generation of a video requires calculation of, for example, 30 images in one second, and consumes a large amount of calculation resources.

Note that a "virtual space in which the user is present" or a "virtual space near which the user is present and with which the user is most strongly related" is referred to as a "virtual space to which the user belongs".

Figure 2:
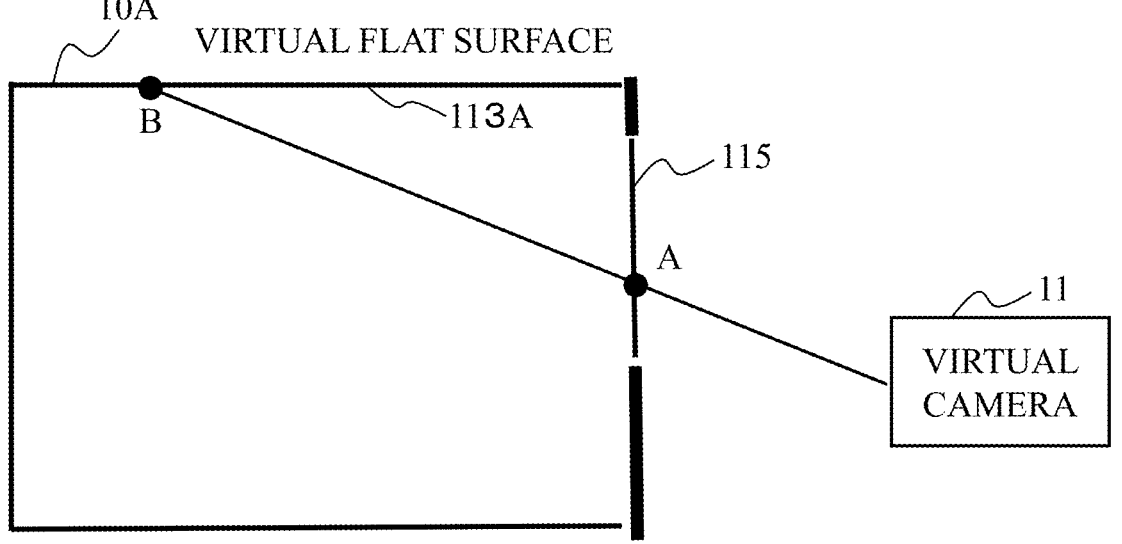
FIG. 2 is a diagram explaining a technique of interior mapping.

FIG. 2 is a diagram explaining a technique of interior mapping. As already given as an example, the technique of interior mapping disclosed in Non-Patent Literature 2 is present.

In the technique of interior mapping, a straight line from the virtual camera 11 to a point A of the glass 115 is extended, and a point B that is an intersection with a virtual flat surface 113A (for example, surface corresponding to an inner wall of the room 10A) is obtained. A texture simulating a landscape of a room interior is associated with the virtual flat surface 113A in advance. Texture coordinates are derived from coordinates of the point B. A color is obtained from information on the texture and the texture coordinates. A computation processing apparatus that calculates an image of the virtual camera 11 associates this color with the position of the point A, and sets the color as imaging data at a position of a corresponding pixel in an imaging plane of the virtual camera 11.

Note that, in this method, in order to render a figurine or furniture in the room, an additional virtual flat surface is desirably arranged at a position of the figurine or furniture.

Then, as illustrated in FIG. 1A, the user can be made to virtually exist in the room 10B that is the three-dimensional virtual space. Specifically, an image that appears as if user is moving in the room 10B can be provided to the user by arranging the virtual camera 11 at the position of the eyes of the user or in a periphery (for example, behind) the user and causing the virtual camera 11 to capture a scene in the case where the user is moving inside the room 10B.

Note that, when the user enters the room 10A from the room 10B, an image in which each of the objects 12 present in the room 10A is captured by the virtual camera 11 is desirably generated by using a fine image generation method to finely capture the status of the room 10A. Moreover, when the user belongs to the room 10A, for example, an image of objects (for example, objects 12B in FIG. 1A) of the room 10B that are present in the room 10B adjacent to the room 10A and that are visible through the glass 115 of the door 114 from the room 10A is desirably generated by a simple method by using the interior mapping.

This enables the following. Using the fine image generation method in the virtual space to which the user belongs and using the image generation method (for example, interior mapping) that consumes less calculation resources than the above-mentioned fine image generation method for the virtual space to which the user does not belong can generate an image that is rich in reality and gives less feeling of strangeness to the user, while reducing consumption of overall calculation resources required for image generation. For example, a desired image can be thereby generated at higher speed.

When the user 20 is sufficiently close to the door 114 in the room 10B and all or most of the image 100 is occupied by the image 113 of the view of the room 10A through the glass, it is possible to generate the image 113 through the glass by the fine image generation method and generate the objects 12B present in the room 10B by the simple image generation method, assuming that the user 20 does not belong to the room 10B and belongs to the room 10A.

Figures 3A, 3B, 3C, 3D:
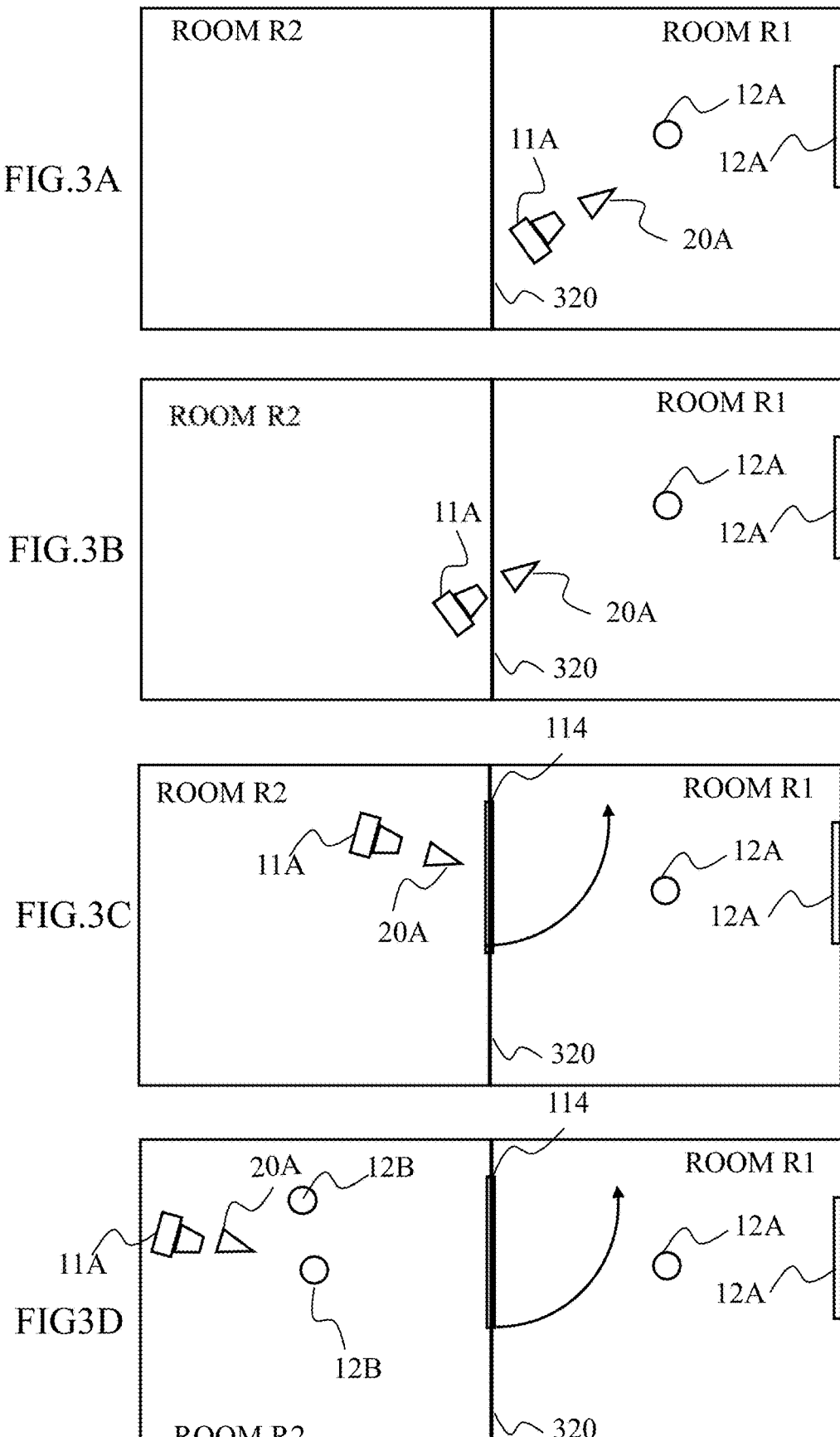
FIGS. 3A to 3D are diagrams illustrating an example of an image generation method using a virtual camera 11A.

FIG. 3A is a diagram illustrating an example of an image generation method using a virtual camera 11A.

A room R1 forms one virtual space. Moreover, a room R2 forms a virtual space different from the room R1.

A user 20A and multiple objects 12A are present in the room R1. The virtual camera 11A is present behind the user 20A, and captures an image. In this case, the configuration may be such that a character of the user is arranged at a position of the user 20A, and the virtual camera 11A captures the character of the user 20A.

In the case of FIG. 3A, the virtual camera 11A is present in a region of the room R1. However, the position of the camera may be in the room R2 as in FIG. 3B. In this case, the virtual camera 11A desirably generates the objects in the room R1 by the fine image generation method assuming that there is no wall surface 320.

Note that, when an image as viewed from the position of the user 20A is to be captured, the position of the virtual camera 11A only needs to be laid over the position of the user 20A. In this case, the head of the character of the user 20A is not included in the captured image. The same applies to FIGS. 3C and 3D to be described later.

FIG. 3C is a diagram illustrating an example of an image generation method using the virtual camera in the case where the objects 12A are present in the room R1 different from the room R2 to which the user 20A belongs.

The door 114 with a glass that transmits light is present between the room R1 and the room R2. The multiple objects 12A are present in the room R1. Moreover, the user 20A is present in the room R2 that is a virtual space different from the room R1.

In this case, since the multiple objects 12A are present in the room R1 different from the room R2 to which the user 20A belongs, for example, it is desirable that the above-mentioned interior mapping is used as the image generation method relating to the room R1, and the image generation method requiring a fewer calculation amount is used.

FIG. 3D is a diagram illustrating, as an example, generation of an image in the following case: multiple objects 12B are present in the room R2 to which the user 20A belongs; multiple objects 12A are present in the room R1 to which the user 20A does not belong; and the user views the objects 12A through the door 114.

It is desirable that an image of the multiple objects 12B in FIG. 3D is generated by the fine image generation method, and the interior mapping or the like that is the simple image generation method is used for the multiple objects 12A in the room R1 visible through the door 114.

This enables the following. The fine image generation method is used for the multiple objects 12B in the room R2 to which the user 20A belongs, and the simple image generation method is used for the multiple objects 12A in the room R1 to which the user 20A does not belong. Using different image generation methods as described above allows an image to be generated with fewer calculation resources.

Figure 4:
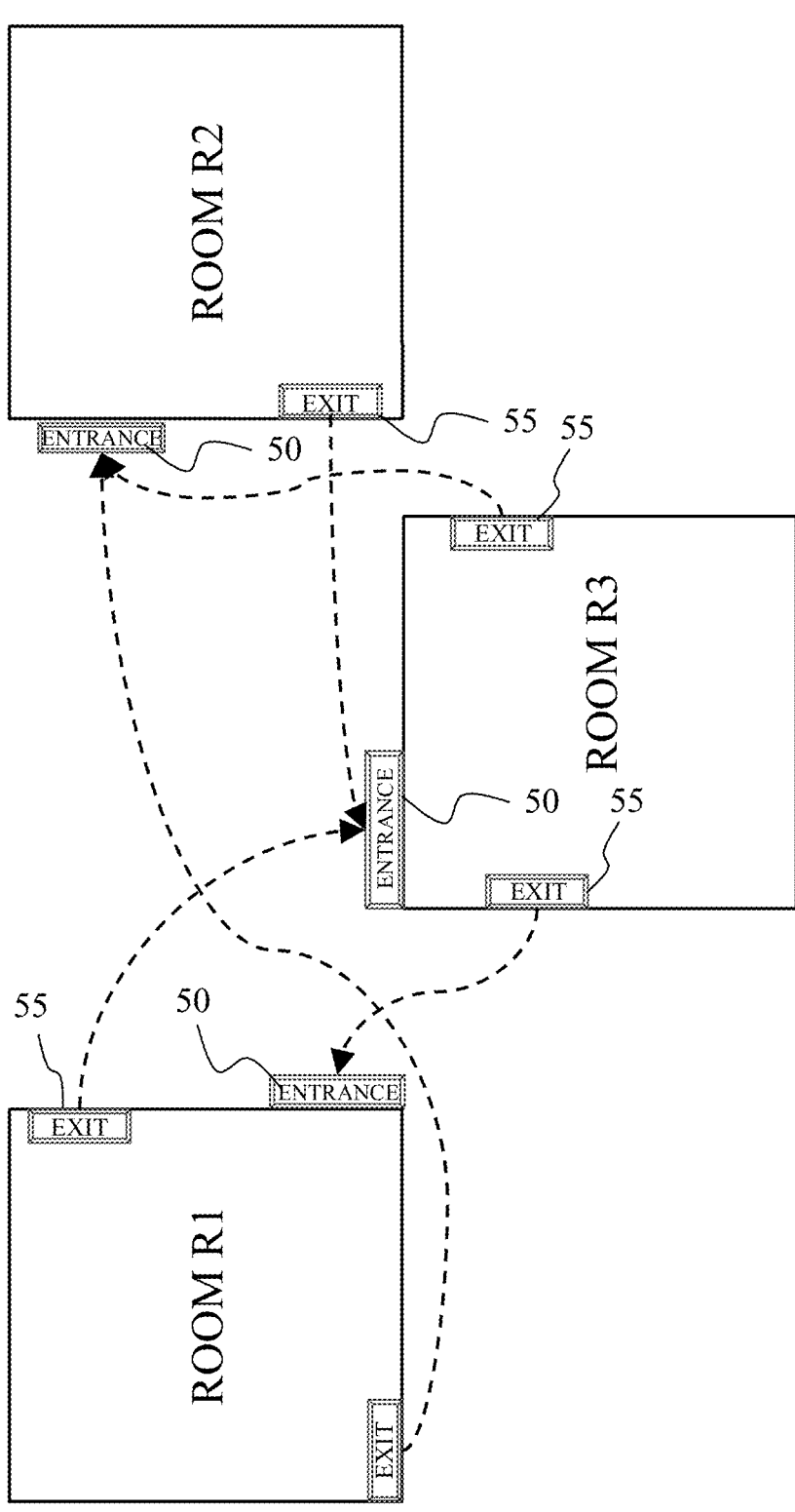
FIG. 4 illustrates a diagram in which an exit-only door 55 and an enter-only door 50 are set for each of a room R1, a room R2, and a room R3 that are three-dimensional virtual spaces different from one another.

FIG. 4 illustrates a diagram in which an exit-only door 55 and an enter-only door 50 are set for each of a room R1, a room R2, and a room R3 that are the three-dimensional virtual spaces different from one another. The enter-only door 50 is a door through which the user can enter the corresponding room from the outside of the room. Moreover, the exit-only door 55 is a door through which the user can exit the corresponding room to the outside.

Since the rooms are different three-dimensional virtual spaces, the exit-only door 55 of each room can be arbitrary linked to the enter-only door 50 of another room. This link may be determined in advance, or the user may be able to change the link.

The following embodiment is possible as one example.

[Embodiment 1] (FIG. 4)

The user can provide one entrance in the user's own room. The user can provide any number of exits in the user's own room.

For one exit, only one room being a destination of this exit can be set.

Such setting allows the user to limit an entrance through which the other users enter the user's own room to one. Moreover, the exits for the user to move to the other user's rooms are provided as many as the number of rooms being destinations desired to be visited by the user.

A possible embodiment is not limited to the above embodiment. For example, for the room R3 in which artworks of a specific user R are exhibited, the user may provide many multiple doors leading to the room R3. The user can thereby facilitate reaching of the room R3 in which the user's own artworks are exhibited. Moreover, a door may be arranged in advance in a room in which an information booth or the like is provided to allow any user to easily enter and exit this room. An environment in which the user can easily use the three-dimensional virtual spaces can be thereby provided.

Moreover, as an expanded embodiment of the above-mentioned Embodiment 1, the following embodiment is possible.

Figures 25A, 25B:
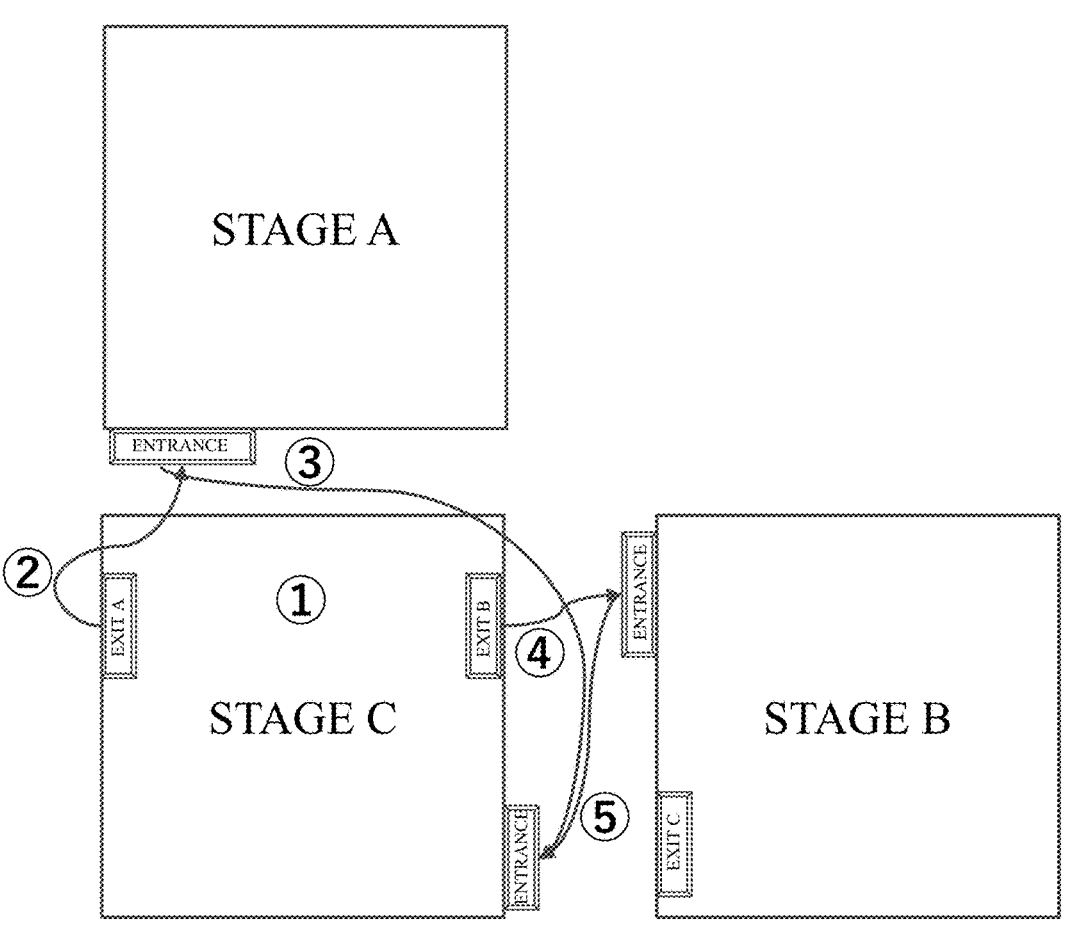
FIGS. 25A and 25B are diagrams illustrating movement patterns and landscapes visible from entrances in the three-dimensional virtual spaces.

[Embodiment 2] (FIGS. 25A and 25B)

The user can return to an original room by exiting a room through an entrance of the enter-only door, provided that the user has entered the room through this entrance. In the case where the user returns to the original room through the enter-only door, the user enters the return-destination room from the entrance.

This setting can prevent occurrence of a case where the user enters the room through the exit-only door.

Moreover, it is desirable that a transparent glass is installed in a door, and an interior of a room to which the user can move is visible through the glass. This allows the user to recognize the state of the room beyond the door, and can prevent the user from getting lost in a vast three-dimensional virtual space.

In the case of above-mentioned Embodiment 1 (FIG. 4), a state of the destination room as viewed from the entrance of this room is displayed on the glass of the exit door. Since the user cannot move through the entrance door, nothing is displayed on the glass of the entrance door.

In the case of above-mentioned Embodiment 2 (FIGS. 25A and 25B), when the user returns to the original room through the entrance door, the state beyond the entrance door changes depending on the movement as illustrated in the table.

Figure 5:
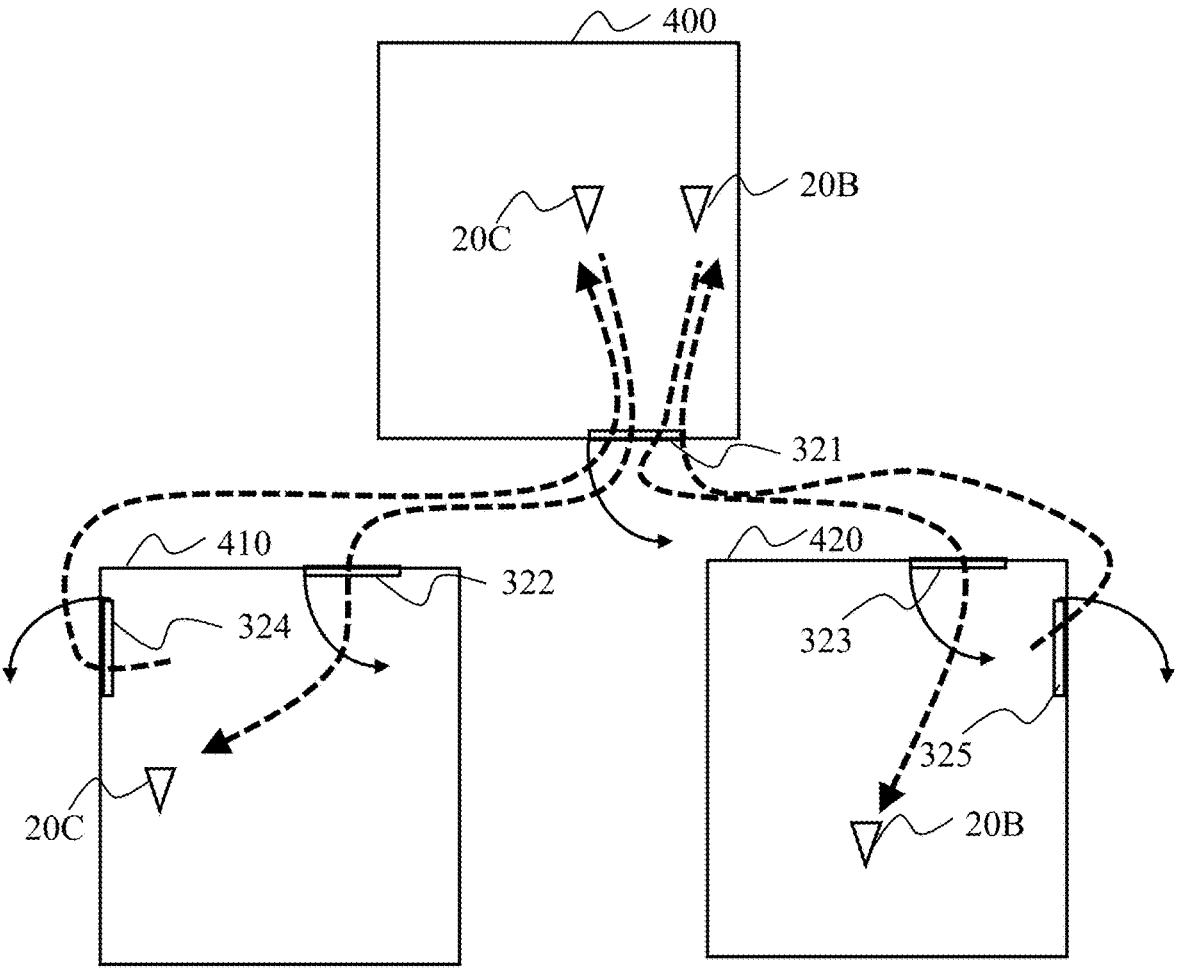
FIG. 5 is a diagram illustrating that, when different users enter the same room 400 via the same door 321, the users can return to rooms that vary depending on the users, via the same door 321.

FIG. 5 is a diagram illustrating a case where, when different users enter the same room 400 via the same door 321, the users can return to rooms that vary depending on the users, via the same door 321.

FIG. 5 illustrates that, when a user 20C present in a room 410 enters the room 400 via a door 324, the user 20C enters the room 400 from the door 321. Moreover, FIG. 5 illustrates that, when a user 20B present in a room 420 enters the room 400 via a door 325, the user 20B enters the room 400 from the door 321.

The user 20C present in the room 400 may be allowed to return to the original room 410 via the door 321 and via a door 322 of the room 410. Moreover, the user 20B present in the room 400 may be allowed to return to the original room 420 via the door 321 and via a door 323 of the room 420.

Moreover, the user 20C present in the room 400 may be allowed to view the state of the objects in the original room 410 as viewed from the door 322, through the door 321. Furthermore, the user 20B present in the room 400 may be allowed to view the state of the objects in the original room 420 as viewed from the door 323, through the door 321.

This allows each user to move to the rooms that are virtual spaces in reverse of the order in which the user has passed through the rooms, and can prevent the user from getting lost in a complex route.

Figure 6:
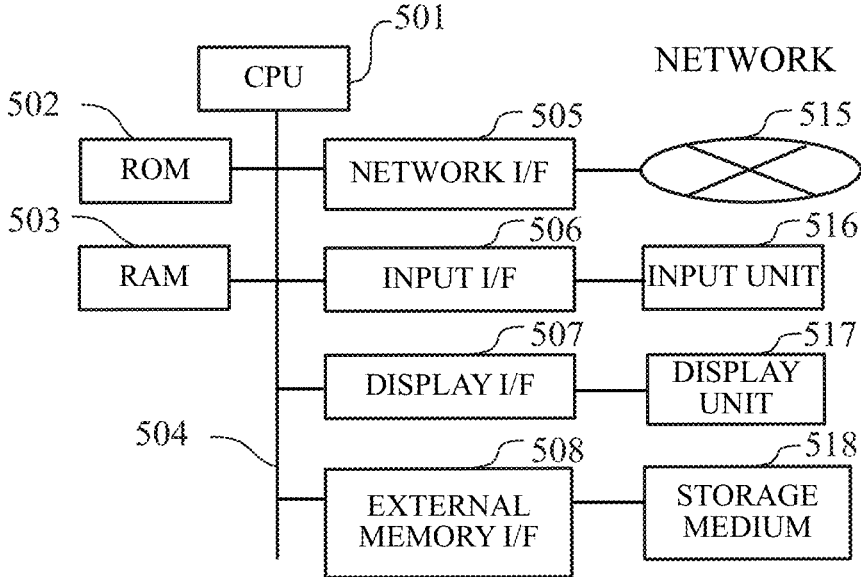
FIG. 6 is a hardware configuration diagram of an embodiment.

FIG. 6 is a hardware configuration diagram of the embodiment.

The hardware configuration of the embodiment includes a CPU 501, a ROM 502 in which a program and data of the present embodiment can be stored, a RAM 503, a network interface 505, an input interface 506, a display interface 507, and an external memory interface 508. These pieces of hardware are connected to one another by a bus 504.

The network interface 505 is connected to a network 515. The network 515 includes a wired LAN, a wireless LAN, the Internet, a telephone network, and the like. An input unit 516 is connected to the input interface 506. A display unit 517 is connected to the display interface 507. The display unit 517 may be implemented by multiple display devices. A storage medium 518 is connected to the external memory interface 508. The storage medium 518 may be a RAM, a ROM, a CD-ROM, a DVD-ROM, a hard disk, a memory card, a USB memory, or the like.

A processing flow of the embodiment is explained below.

Figure 7:
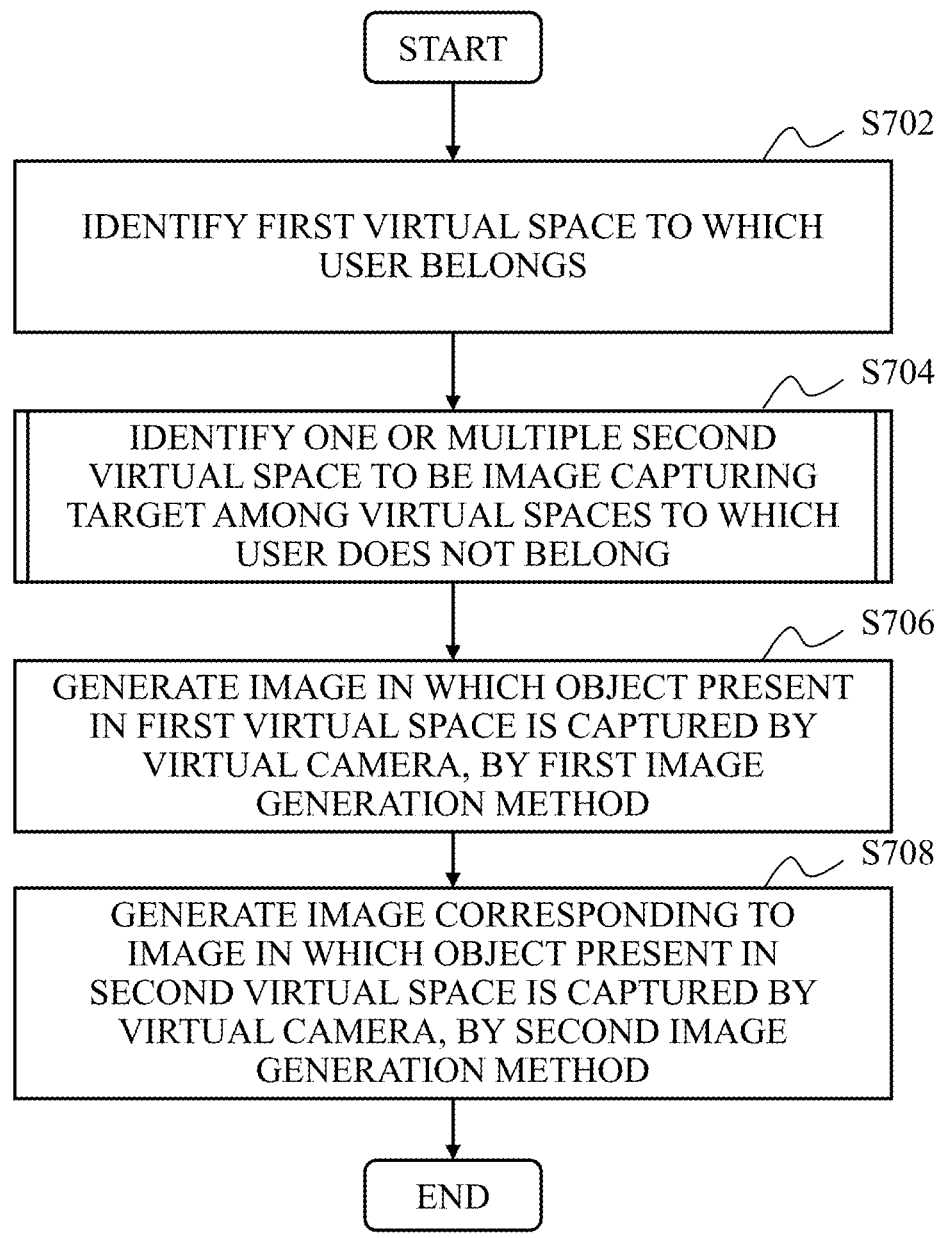
FIG. 7 illustrates an outline of a processing flow of the embodiment.

FIG. 7 illustrates an outline of the processing flow of the embodiment. Each step is explained.

[Step S702] A first virtual space to which the user belongs is identified. In this case, belong includes, for example, not only the case where the user is present in the first virtual space but also the case where the user is at a position close to the first virtual space and is attempting to enter the first virtual space, the case where an artwork of the user is displayed in the first virtual space and the user is approaching the first virtual space, and the like. Moreover, belong includes the case where there is a special relationship between the user and the first virtual space.

[Step S704] One or multiple second virtual spaces to be an image capturing target among the virtual spaces to which the user does not belong are identified. Image capturing is performed by the virtual camera.

[Step S706] An image in which an object present in the first virtual space is captured by the virtual camera is generated by a first image generation method. The first image generation method is desirably the fine image generation method.

[Step S708] An image corresponding to an image in which an object present in the second virtual space is captured by the virtual camera is generated by a second image generation method. The second image generation method desirably uses a method such as interior mapping that can save calculation resources for generating an image.

In the above processing, the fine image generation method is used for the object strongly-related to the user and the simpler image generation method is used for other objects. This enables generation of an appropriate image that is satisfying for the user while saving the calculation resources required for image generation.

Figure 8:
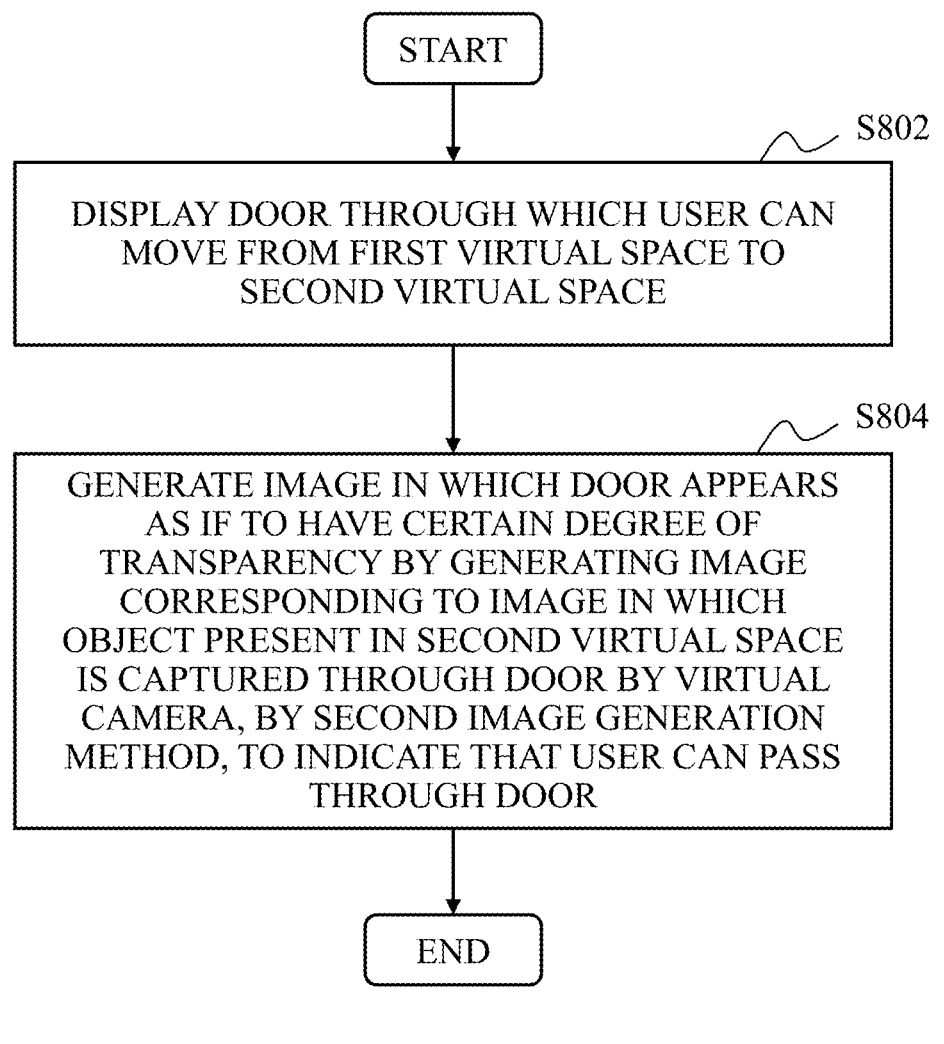
FIG. 8 illustrates a flow of presenting a passable door to the user in a simple manner.

FIG. 8 illustrates a flow in which a virtual space that can be a destination is present to the user in a simple manner. Steps are explained below.

[Step S802] A door through which the user can move from the first virtual space to the second virtual space is displayed.

[Step S804] An image in which the door appears as if to have a certain degree of transparency is generated by generating an image corresponding to an image in which the object present in the second virtual space is captured through the door by the virtual camera by the second image generation method, to indicate that the user can pass through the door.

Performing such processing can notify the user in advance of the state of the virtual space to which the user can move, and provide a three-dimensional virtual space with a higher usability value for the user.

Figure 9:
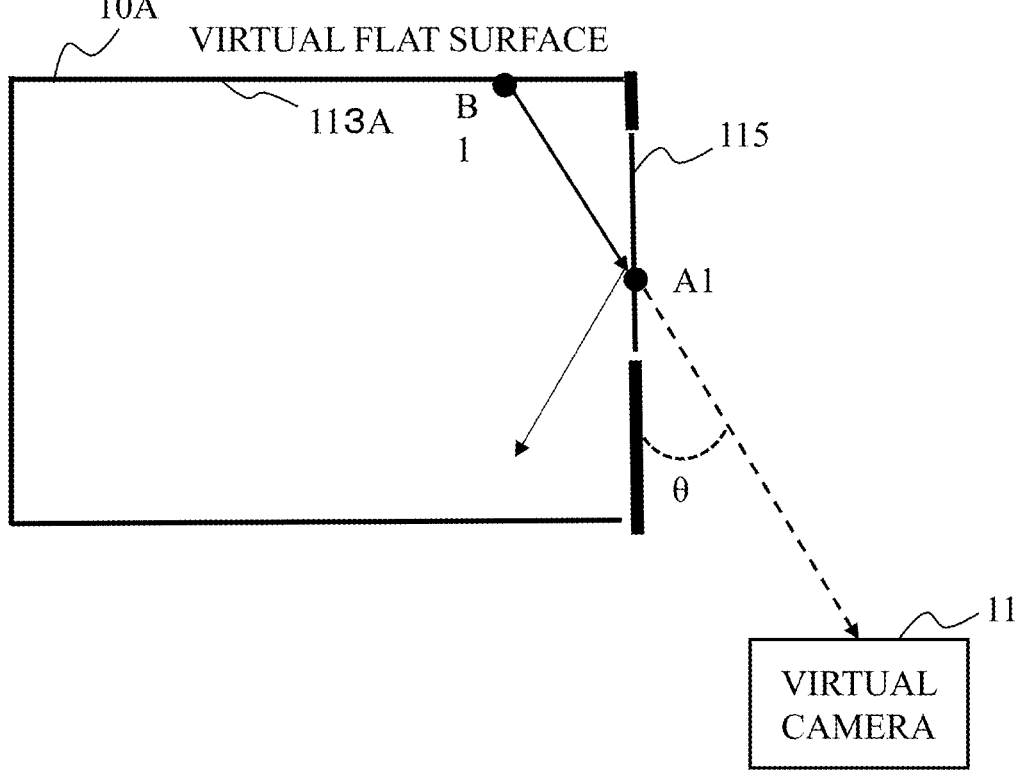
FIG. 9 is a diagram illustrating an example in which a degree of transparency of the glass 115 is varied depending on, for example, an angle between a surface of a transparent material such as the glass 115 and an image capturing direction of the virtual camera.

FIG. 9 is a diagram illustrating an example in which the degree of transparency of the glass 115 is varied depending on, for example, an angle between a surface of a transparent material such as the glass 115 and an image capturing direction of the virtual camera.

FIG. 9 is a diagram similar to FIG. 2, and elements are denoted by similar reference signs. When the angle θ formed between the glass 115 and the image capturing direction from the virtual camera 11 is equal to or smaller than a predetermined angle, for example, the degree of transparency of the glass 115 may be reduced. When the angle θ is smaller than the predetermined angle, a situation where reflection of ambient light on the glass 115 and the like increase and the object in the room 10A becomes difficult to recognize through the glass 115 is experienced in many cases in the real world. Accordingly, under such a condition, the degree of transparency of the glass 115 is reduced to reproduce a more-natural image. Alternatively, the degree of transparency of the glass 115 may be set to non-transparent. In the case where the degree of transparency is set to non-transparent, the processing of generating the image of the object in the room 10A visible through the glass 115 can be omitted. Accordingly, the consumption of calculation resources can be further reduced.

Figure 10:
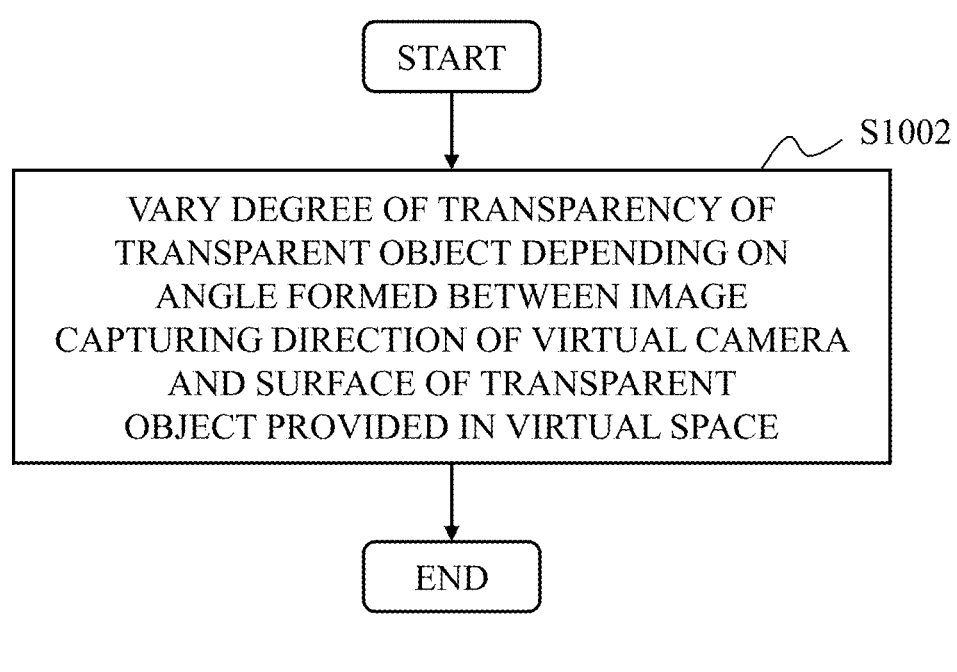
FIG. 10 is a diagram illustrating a flow of image generation depending on the angle formed between the glass 115 and the image capturing direction of the camera illustrated in FIG. 9.

FIG. 10 is a diagram illustrating a flow of image generation depending on the angle formed between the glass 115 and the image capturing direction of the camera illustrated in FIG. 9.

[Step S1002] The degree of transparency of the transparent object is varied depending on the angle formed between the image capturing direction of the virtual camera and the surface of the transparent object provided in the virtual space.

This enables generation of a more-natural image. Moreover, making the glass 115 non-transparent can reduce the consumption of calculation resources.

Figure 11:
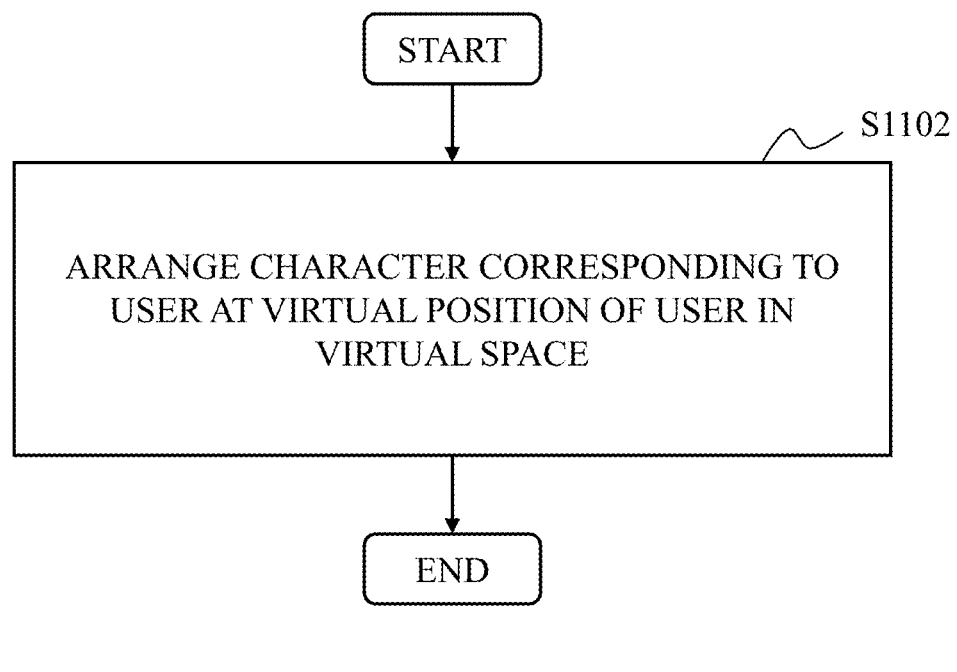
FIG. 11 illustrates a flow of increasing a sense of immersion into the three-dimensional virtual spaces for the user using the three-dimensional virtual spaces.

FIG. 11 illustrates a flow of increasing a sense of immersion into the three-dimensional virtual space for the user using the three-dimensional virtual space.

[Step S1102] A character corresponding to the user is arranged at a virtual position of the user in the virtual space. A character resembling the user or a character selected by the user from among existing characters is arranged in the three-dimensional virtual space.

Figure 26:
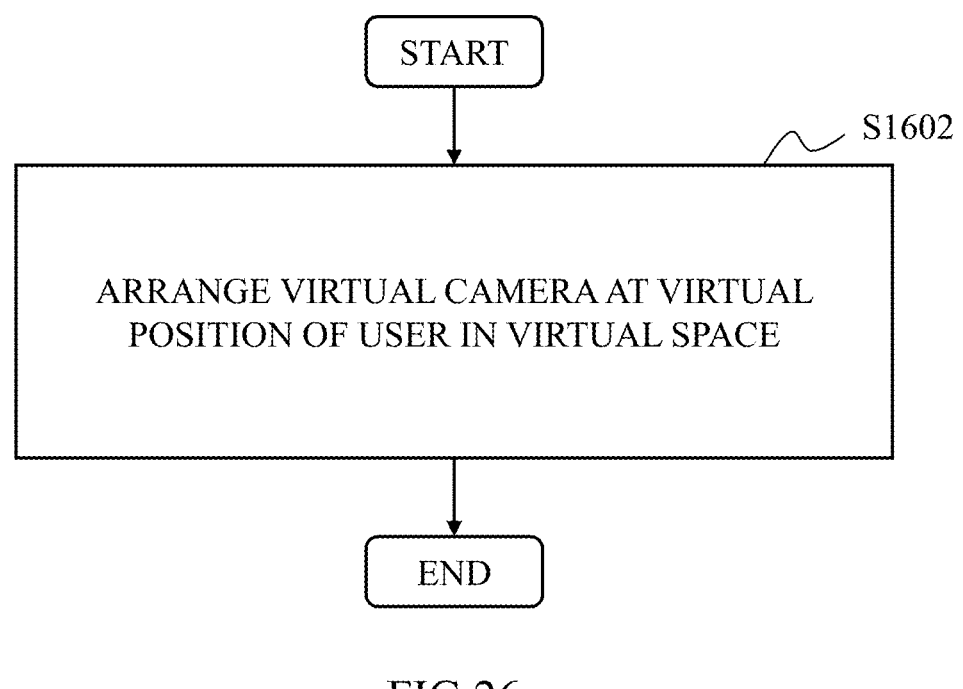
FIG. 26 illustrates a flow of arranging the virtual camera at a virtual position of the user in the virtual space.

FIG. 26 illustrates a flow of arranging the virtual camera at the virtual position of the user in the virtual space.

[Step S1602] The virtual camera is arranged at the virtual position of the user in the virtual space. This generates an image relating to the three-dimensional virtual space as viewed from the eyes of the virtual character corresponding to the user. Such arrangement enables rendering of the three-dimensional virtual space as viewed from the positions of the eyes of the user, and can provide more realistic experience to the user.

Figure 27:
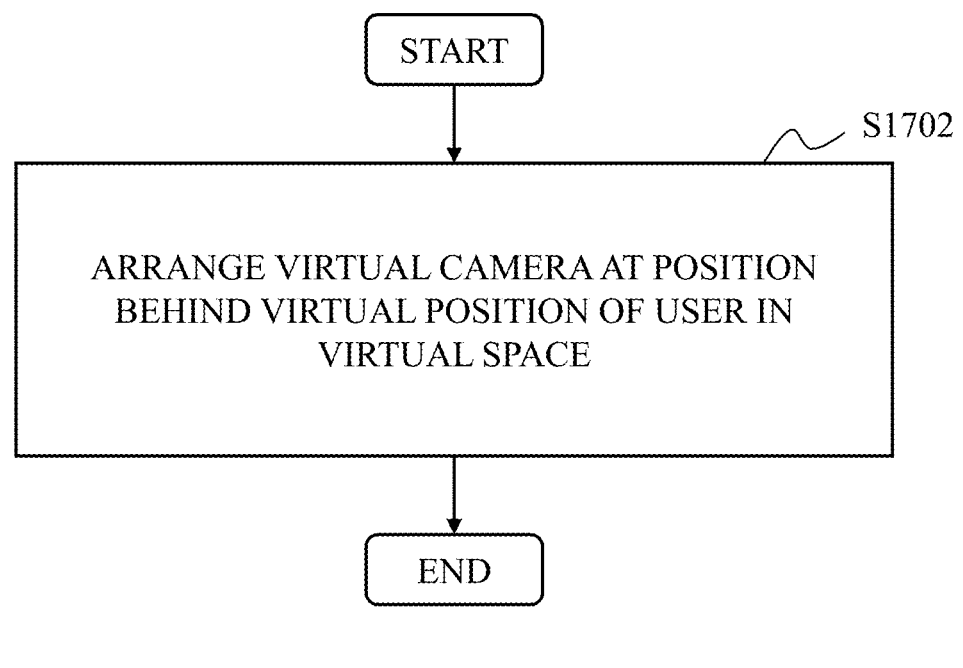
FIG. 27 illustrates a flow of arranging the virtual camera at a position behind the virtual position of the user in the virtual space.

FIG. 27 illustrates a flow of arranging the virtual camera at a position behind the virtual position of the user in the virtual space.

[Step S1702] The virtual camera is arranged at the position behind the virtual position of the user in the virtual space. Such arrangement allows the character that is an avatar of the user present in the three-dimensional virtual space to be included in the image.

Figure 12A:
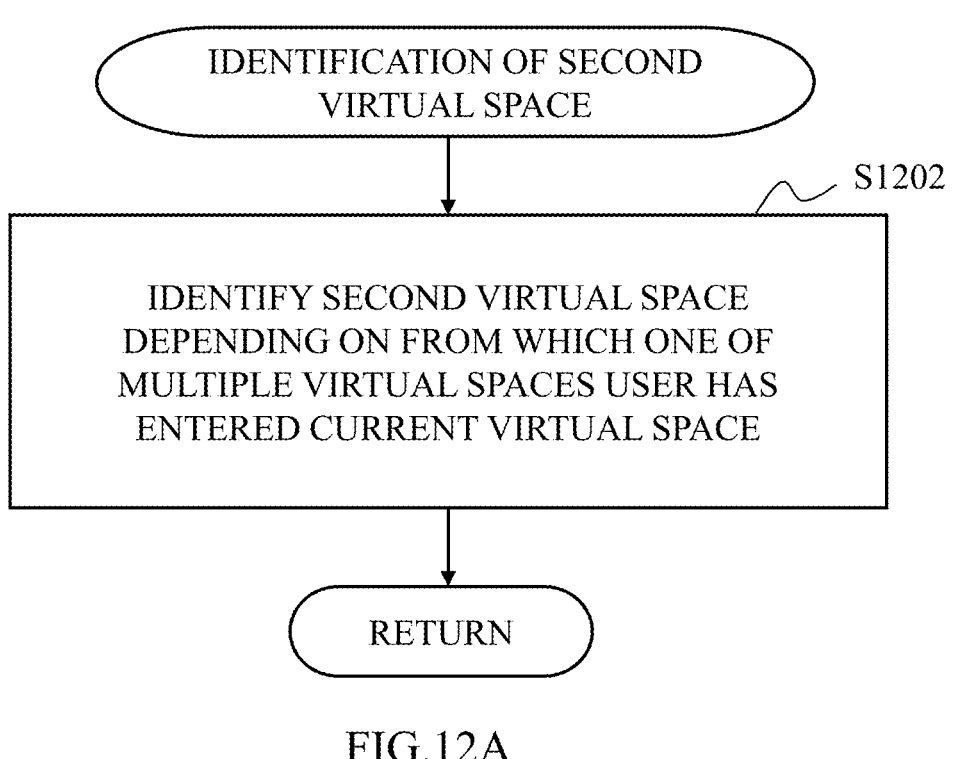
FIGS. 12A and 12B illustrate a processing flow that allows the user to notice the second virtual space with a high degree of relation to the user in a simple manner.
Figure 12B:
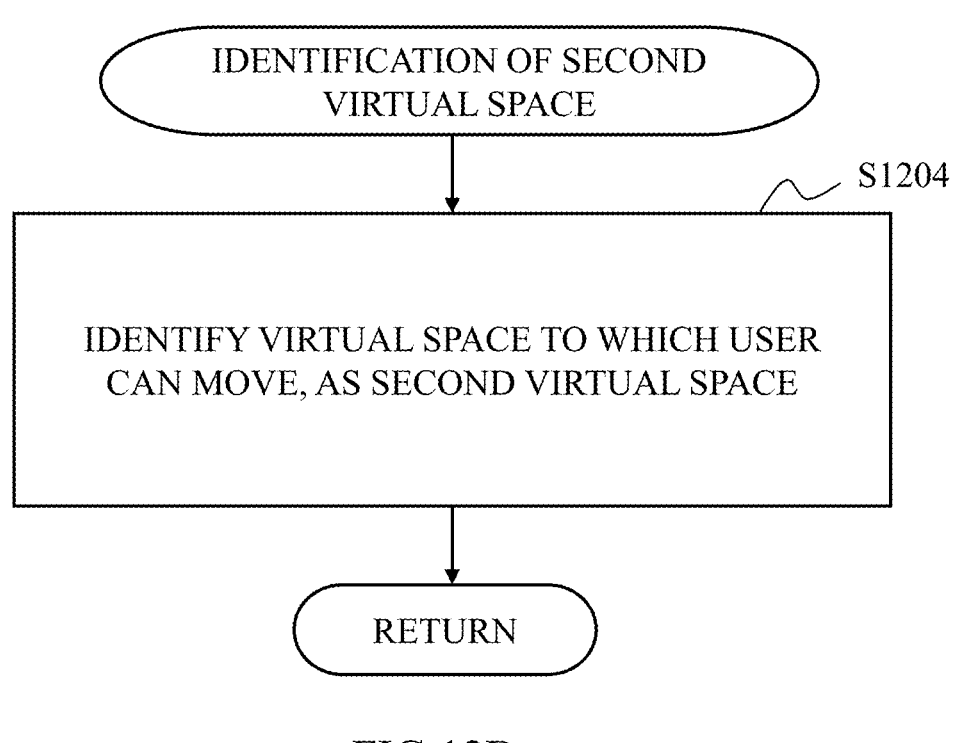

FIGS. 12A and 12B illustrate a processing flow that allows the user to notice the second virtual space with a high degree of relation to the user in a simple manner.

Steps in FIG. 12A are explained below.

[Step S1202] The second virtual space is identified depending on from which one of the multiple virtual spaces the user has entered the current virtual space. This processing allows the user to easily notice the virtual space through which the user has passed in the vast entire virtual space. This allows the user to easily return to the virtual space from which the user has moved, and can prevent the user from getting lost in the virtual space.

[Step S1204] A virtual space to which the user can move is identified as the second virtual space. This processing allows the user to easily notice the virtual space related to the user.

FIG. 13 illustrates a flow of switching the image generation method in the case where the user moves from virtual space to another.

[Step S1302] When the user moves from the first virtual space to the second virtual space and this causes the second virtual space to become the new first virtual space and the first virtual space to become the new second virtual space, an image in which the object present in the virtual space that has become the new first virtual space is captured by the virtual camera is generated by the first image generation method, and an image corresponding to an image in which the object present in the virtual space that has become the new second virtual space is captured by the virtual camera is generated by the second image generation method.

This processing enables switching between the fine image generation method and the simple image generation method. Using the fine image generation method for the object with a high degree of interest for the user by actively switching to the fine image generation method generates an image that gives less sense of strangeness to the user, with less calculation resources.

Modified Example of Interior Mapping

The "interior mapping" is known as a method of rendering an interior (floor, ceiling, and wall) of a building without modeling.

A modification example of the interior mapping is explained below with reference to the renderings.

The description returns to FIG. 2. In FIG. 2, instead of modeling the inner surface (floor, ceiling, and wall) of the room with polygons, a texture image associated with the virtual flat surface 113A corresponding to the inner surface of the room is used. The straight line from the point of view of the virtual camera 11 to the point A of the glass 115 is extended. The point B that is the intersection with the virtual flat surface 113A being the inner surface of the room is obtained. The texture coordinates are derived from the coordinates of the point B. The color is obtained from the texture image and the texture coordinates. An image that appears as if the inner surface of the room is present beyond the glass 115 can be obtained by this method.

In the method illustrated in FIG. 2, in order to render an object such as a figurine or furniture in the room, an additional virtual flat surface is desirably arranged at the position of the figurine or furniture.

Figure 14:
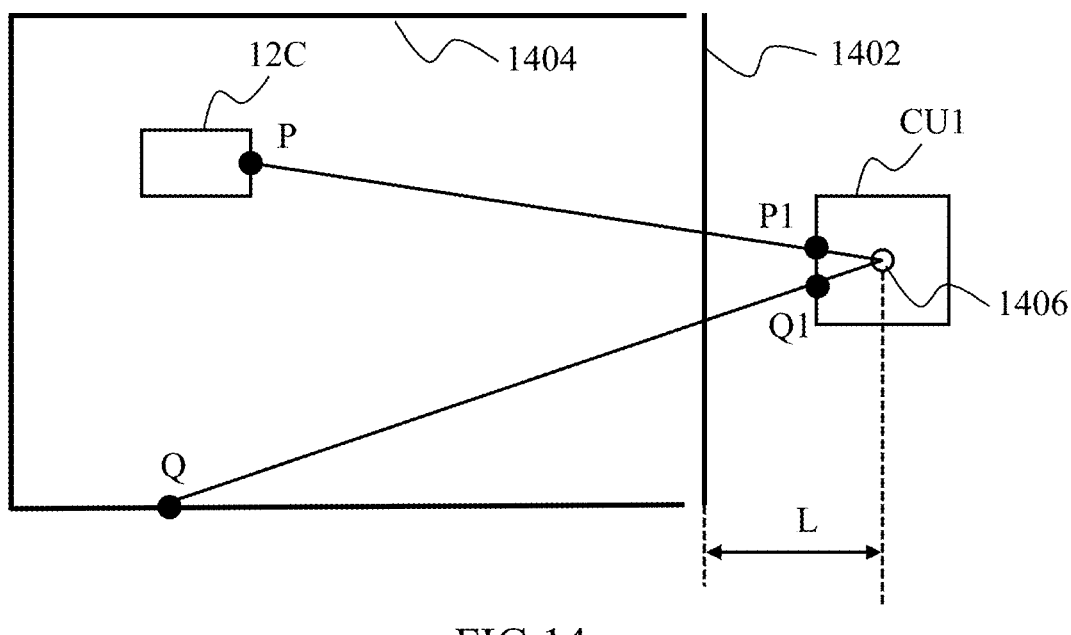
FIG. 14 is a diagram illustrating another embodiment of interior mapping.

FIG. 14 is a diagram illustrating another embodiment of the interior mapping.

In the method of the present embodiment, an image corresponding to the object such as the figurine or furniture in the room can be rendered without arranging the additional virtual flat surface. To this end, environment mapping such as cube mapping can be used.

Processing of the present embodiment is explained below.

1) Creation of Environment Map

In the method of the present disclosure, an environment map such as a cube map is prepared in advance.

FIG. 14 illustrates a method of creating the cube map. First, a wall surface 1404 and an object 12C such as a figurine or furniture created by polygons or the like are arranged. The wall surface and the figurine or furniture may be finely created by using many polygons. Moreover, textures are desirably attached to the wall surface and the figurine or furniture. As illustrated in FIG. 14, a cube CUI for cube mapping is desirably arranged at a distance L from a window 1402 that is an outer wall, at the center of the room in the width direction. The position where the cube CUI is arranged is not limited to this example, and arrangement may be different from that in this example.

In the above explanation using FIGS. 1A and 1B, the following matter is stated.

The configuration may be such that, when the user 20 is sufficiently close to the door 114 in the room 10B and all or most of the image 100 is occupied by the image 113 of the view of the room 10A through the glass, the image 113 through the glass is generated by the fine image generation method and the objects 12B present in the room 10B are generated by the simple image generation method, assuming that the user 20 does not belong to the room 10B and belongs to the room 10A.

The distance L may be a distance at which determination of "sufficiently close" described above is made. Such setting can reduce discontinuity of images generated in switching from the simple image generation method to the fine image generation method.

A point P on a surface of the object 12C such as the figurine or furniture and the center 1406 of the cube are connected to each other by a straight line, and an intersection P1 of this straight line and the cube CUI is obtained. Similarly, a point Q on a surface of the wall surface 1404 and the center 1406 of the cube are connected to each other by a straight line, and an intersection Q1 of this straight line and the cube CUI is obtained. In the example of FIG. 14, the point P on the surface of the object 12C such as the figurine or furniture is mapped to the point P1, and the color of the point P1 is set to the color of the point P. Similarly, the point Q on the surface of the wall surface is mapped to the point Q1. The cube CUI is thus created.

2) Rendering Using Environment Map

Figure 15:
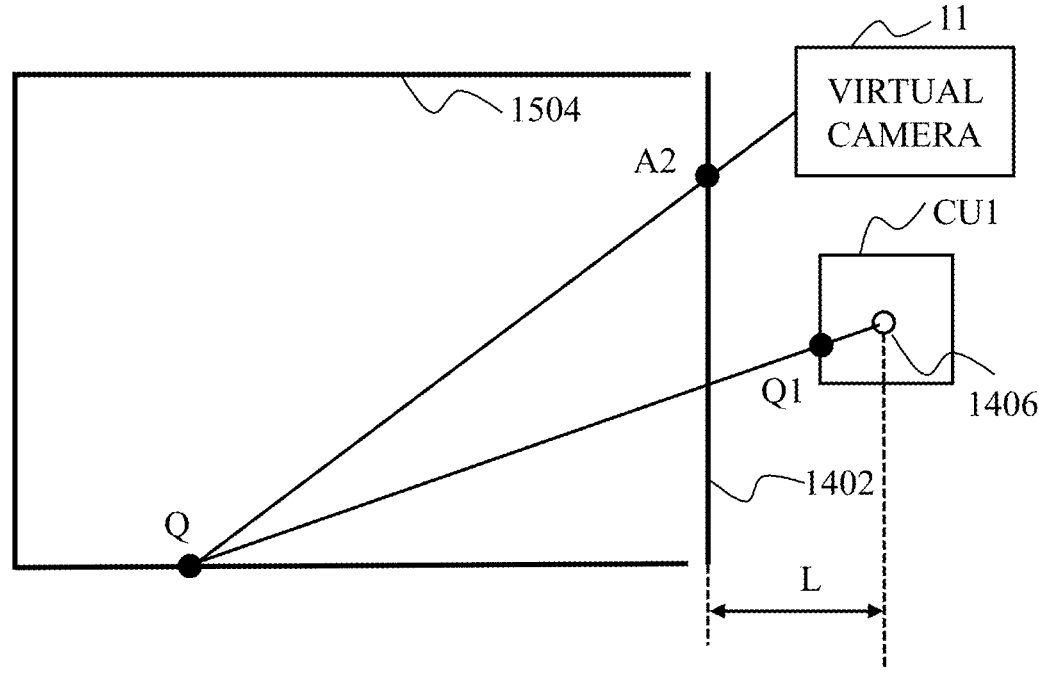
FIG. 15 is a diagram illustrating a rendering method of the embodiment using a cube map.

FIG. 15 is a diagram illustrating a rendering method of the embodiment using the cube map. A color in rendering of a point A2 on the window 1402 is obtained as follows.

A virtual flat surface 1504 is arranged at a position corresponding to the wall surface. A straight line connecting the virtual camera 11 and the point A2 is extended, and a point Q that is an intersection with the virtual flat surface 1504 is obtained. The point Q and the center 1406 of the cube CUI are connected to each other by a straight line, and a point Q1 that is an intersection of this straight line and the cube is obtained. The window 1402 is rendered by using the color of the point Q1 as the color of the point A2.

Using the methods 1) and 2) described above enables obtaining of a rendering result that appears as if the wall surface (inner wall of the room) and the figurine or furniture are present behind the window 1402.

Other Modified Examples

Figure 16A:
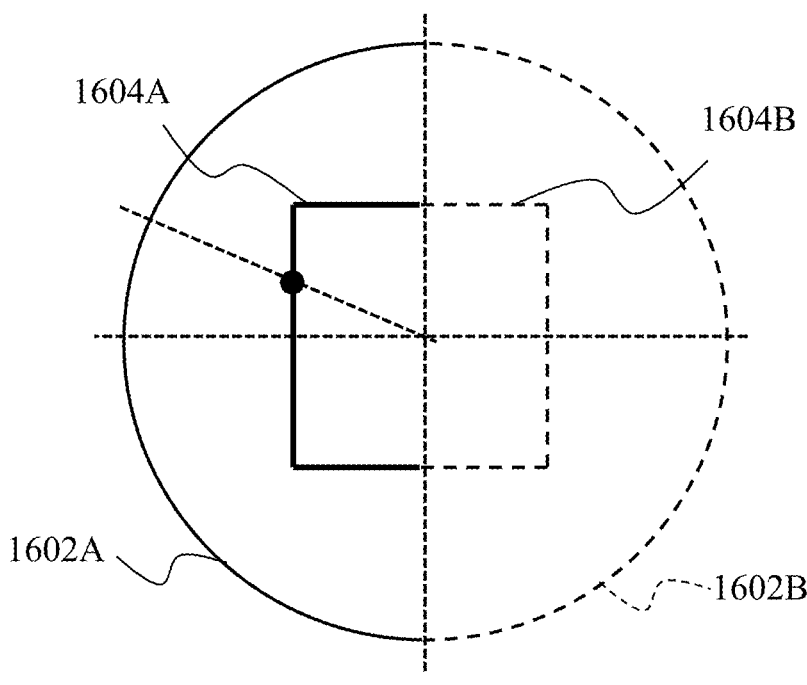
FIG. 16A is a diagram illustrating a half cube 1604A.

FIG. 16A is a diagram illustrating a half cube 1604A.

The cube map may be used by being further mapped onto a spherical surface. Since a surrounding environment corresponding to a full sphere (1602A and 1602B) is mapped to a normal cube map (1604A and 1604B), the entire cube map is used by being mapped onto a full spherical surface. However, as in FIG. 16A, only the half cube 1604A that is a room-side (left in FIG. 16A) half of the cube to which the surrounding environment corresponding to the full sphere (1602A and 1602B) is mapped may be used to map a surrounding environment corresponding to a hemisphere 1602A onto a hemispherical surface. In this case, only the objects present in the surrounding environment corresponding to the hemisphere 1602A are mapped onto the hemispherical surface.

Figure 16B:
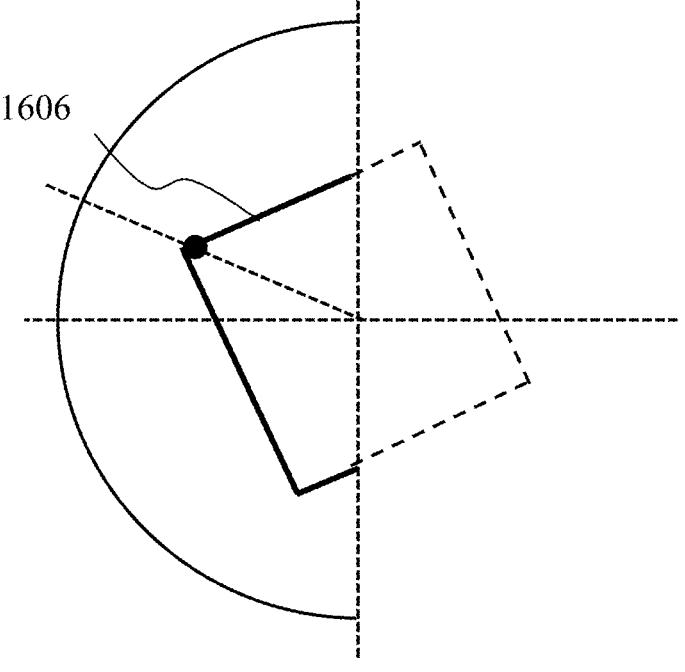
FIG. 16B is a diagram illustrating an example in which a cube arranged in a tilted direction is used.

FIG. 16B is a diagram illustrating an example in which a cube arranged in a tilted direction is used.

As illustrated in FIG. 16B, a direction of a cube 1606 for cube map is not limited to a direction parallel to the window 1402 of the room, and may be a tilted direction.

Figure 17A:
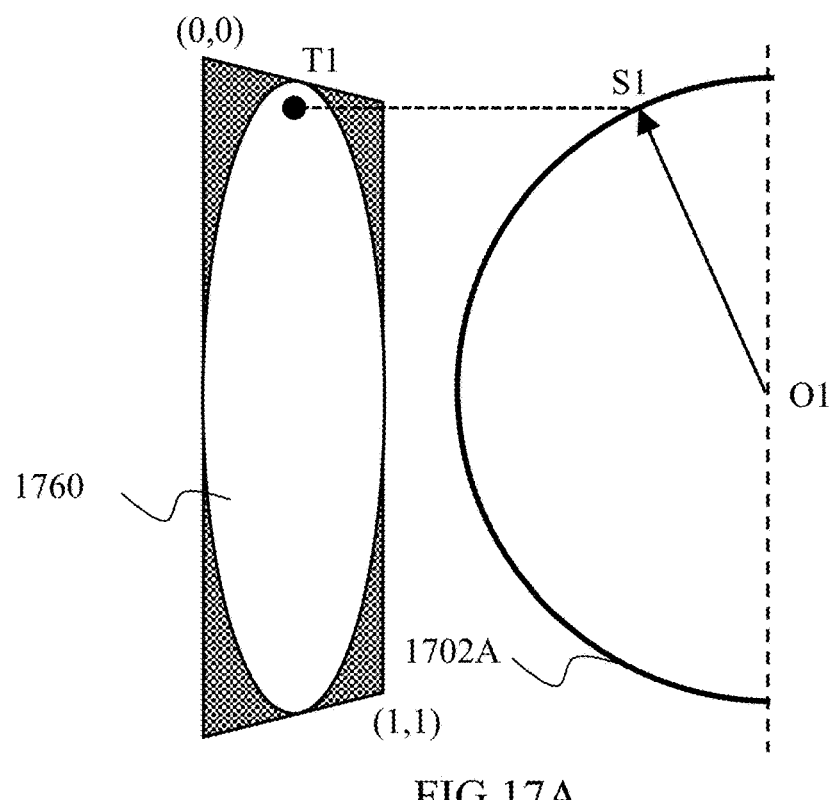
FIGS. 17A and 17B are diagrams illustrating examples in which environment mapping methods other than the cube map are used.
Figure 17B:
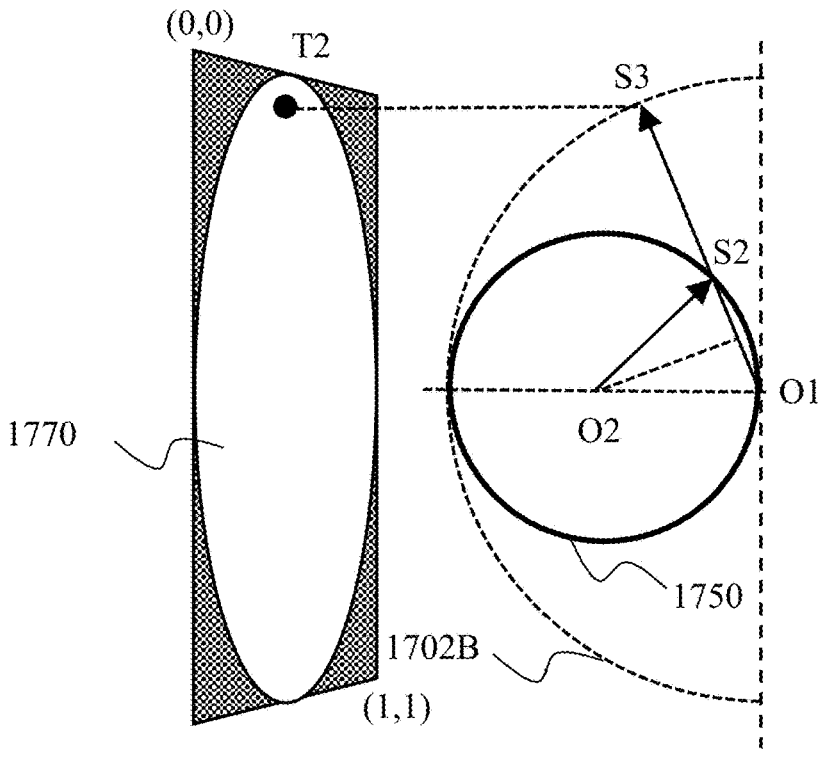

FIGS. 17A and 17B are diagrams illustrating examples in which environment mapping methods other than the cube map are used.

FIG. 17A illustrates an example in which a surrounding environment of a space being a half of the three-dimensional virtual space is mapped onto an environment map texture 1760 that is a circular region on a plane, via a hemispherical surface 1702A. For example, a color of the surrounding environment visible in a line-of-sight direction of O1-S1 is obtained, a foot of a perpendicular dropped from the point S1 to the plane of the environment map texture 1760 is set as T1, and the obtained color of the surrounding environment is used as a color of T1. A color of an object visible on the hemisphere 1702A side with O1 being the point of view can be thereby projected and fixed to the environment map texture 1760.

A color in the O1-S1 direction on the three-dimensional virtual space can be obtained in a simple manner by using this environment map texture 1760.

FIG. 17B is a diagram illustrating an example in which a surrounding environment in all directions of the three-dimensional virtual space is mapped to an environment map texture 1770 via a full spherical surface 1750 and a hemispherical surface 1702B. For example, first, a color of the surrounding environment visible in a line-of-sight direction of O2-S2 is obtained. A point S3 where an extended line of O1-S1 and the hemispherical surface 1702B intersect is obtained. A foot of a perpendicular dropped from the point P3 to a plane of the environment map texture 1760 is set as T2, and the obtained color of the surrounding environment is used as a color of T2. The color of the surrounding environment in all direction with O2 being the point of view can be thereby projected and fixed to the environment map texture 1770.

A color in the O2-S2 direction on the three-dimensional virtual space can be obtained in a simple manner by using this environment map texture 1770.

Figure 18:
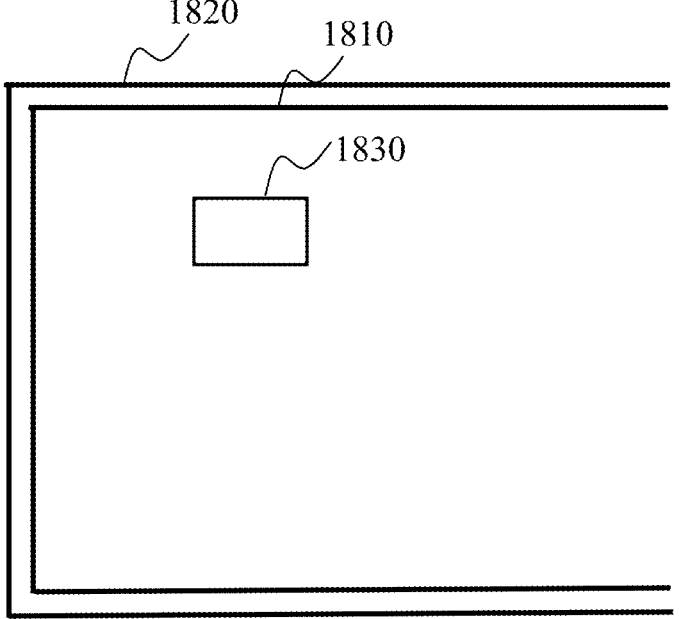
FIG. 18 is a diagram illustrating an embodiment in which a rendering result similar to that in the case where rendering is performed by interior mapping is obtained by using polygons and a texture.

FIG. 18 is a diagram illustrating an embodiment in which a rendering result similar to that in the case where rendering is performed by interior mapping is obtained by using polygons and a texture. The embodiment is explained below.

<1-1 Groundwork>

1) A cube map is first created by the method of FIG. 14.

2) FIG. 18 is diagram of a room as viewed from above. As in FIG. 18, five planes corresponding to fives wall surfaces (1810) of a floor, a ceiling, a far-side wall, and left and right walls are created by polygons 1820. From the viewpoint of reducing the consumption of calculation resources, the smaller the number of used polygons is, the better it is. The number of used polygons is, for example, five in the case of quadrilateral polygons, and ten in the case of triangular polygons.

3) Original objects 1810 and 1830 (wall surfaces, figurine or furniture, and the like) are removed, and the above-mentioned polygons 1820 of the five planes are arranged.

Figure 19:
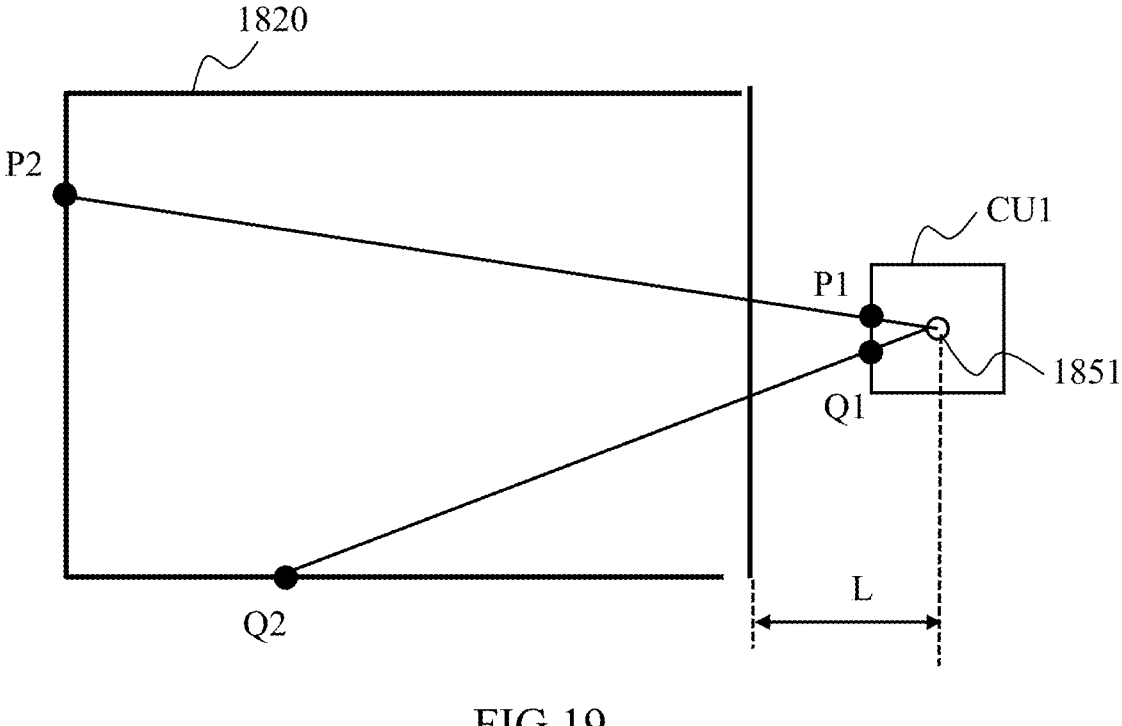

As in FIG. 19, the cube map is projected from the center 1851 of the cube to the polygons 1820 of the five planes by using the cube map that uses the cube CUI and that has been already explained in FIG. 14 and the like, and texture data for the polygons 1820 is created.

This processing is referred to as baking the texture to the polygons. A point P on a surface of the object 1830 such as a figurine or furniture is projected from a point P1 on the cube map to a point P2 on the polygon. A point Q on the wall surface is projected from a point Q1 on the cube map to a point Q2 on the polygon. A texture image obtained as described above is an image in which not only the wall surface of the room but also the object such as the figurine or furniture in the room are drawn.

<1-2 Rendering>

The polygons of the five planes and the baked texture described above are rendered in a method of rendering texture-mapped polygons. This rendering method is widely adopted as a method of rendering polygons.

Figure 20:
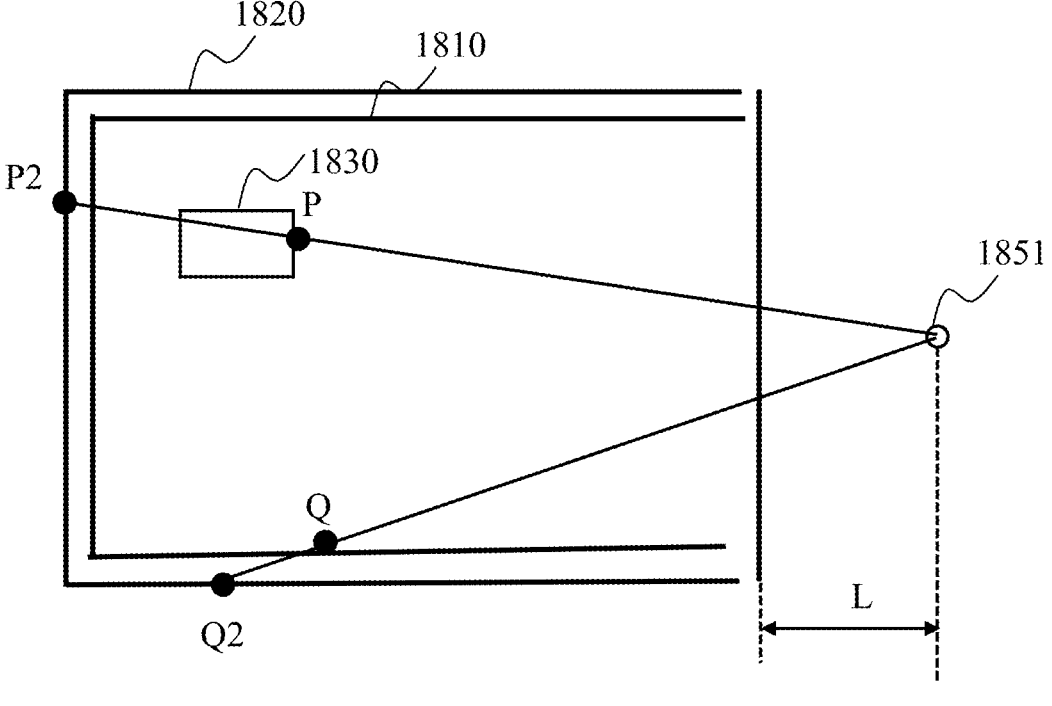
FIG. 20 illustrates an example of processing of baking the texture to the polygons without the cube map.

FIG. 20 illustrates an example of processing of baking the texture to the polygons without the cube map.

In this method, as in FIG. 20, the points (points P and Q) of the wall surface of the room and the object such as the figurine or furniture in the room are projected from a point 1851 corresponding to the center of the cube map to the polygons 1820 of the five planes to create texture data. Specifically, the texture is baked to the polygons 1820. The point P is projected to a point P2. The point Q is projected to a point Q2.

Processing of generating an image hereafter can be achieved by using the already-described virtual camera.

In FIGS. 18 to 20, the position of the polygons 1820 is slightly offset from the position of the wall surface 1810 and is illustrated to be easily noticeable to facilitate viewing of the renderings. However, the polygons 1820 and the wall surface 1810 may be at the same position. In the case where the polygons 1820 and the wall surface 1810 are at the same position, the position of the point Q matches the position of the point Q2.

Other Modified Examples of Rendering Using Interior Mapping

For example, as explained in FIG. 20 and the like, also in a conventional rendering method using polygons and a baked texture, it is possible to obtain a rendering result similar to that in the interior mapping in a simple manner and reduce the calculation resources.

However, the interior mapping of FIG. 15 and the like has such an advantage that an image becomes more natural by the modified example described below, which is an advantage in terms of rendering that the conventional method does not have.

<2-1 Embodiment in which Rendering is Performed with Virtual Flat Surface Moved>

Figure 21:
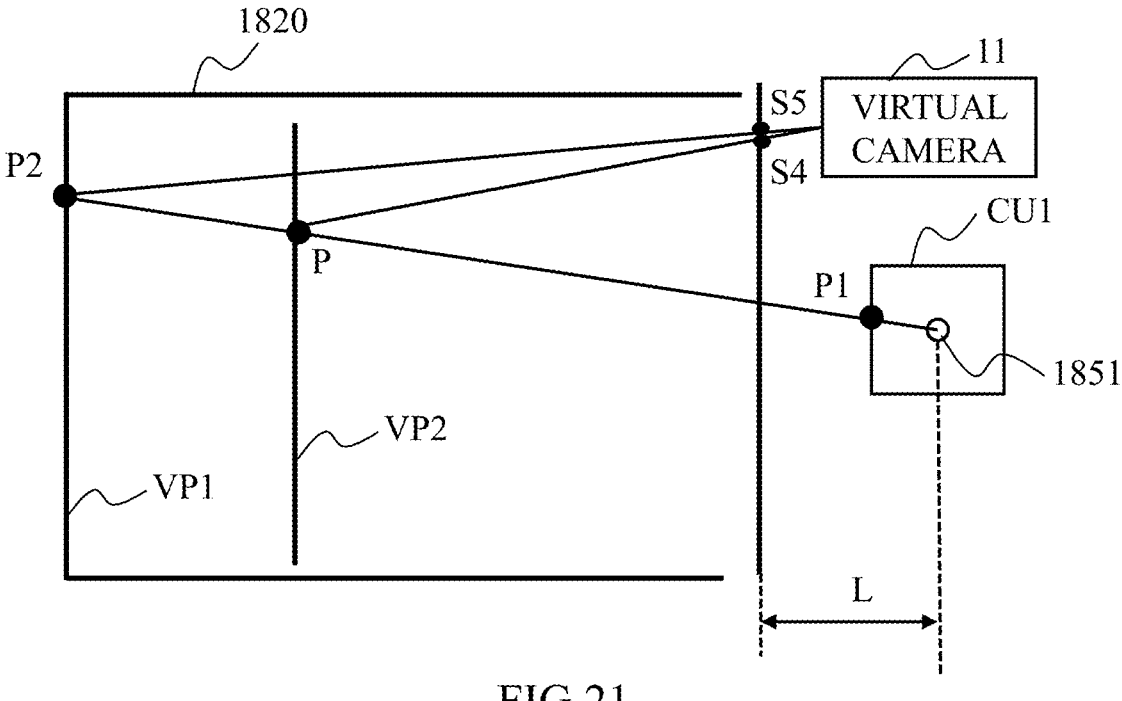
FIG. 21 is a diagram in which a virtual flat surface VP1 corresponding to a far-side wall surface is moved to a virtual flat surface VP2 on the closer side and arranged at a position of the virtual flat surface VP2.

As illustrated in FIG. 21, a point P on a surface of a figurine or furniture is mapped to a point P1 on the cube map. In a view from the position of the camera in FIG. 21, in true proper appearance, the point P on the figurine should be rendered at a position of a point S4 on an outer wall (window).

However, when the rendering is performed by using the above-mentioned polygons 1820, the point P is rendered at a position of a point S5, and is shifted from the point S4 at the correct position. Note that this shifting occurs also in the conventional rendering method using polygons and a baked texture.

Accordingly, a virtual flat surface VP1 corresponding to a far-side wall surface in FIG. 21 is moved to a virtual flat surface VP2 on the closer side, and is arranged at the position of the virtual flat surface VP2. A color of P1 of the cube map is thereby rendered at the point S4, and a correct rendering result can be obtained.

Note that a point present on the far-side wall surface is rendered with rendering position thereof shifted due to this movement from the virtual flat surface VP1 to the virtual flat surface VP2. Accordingly, this modified embodiment is preferably used when a more-important object is (or more objects are) arranged at a certain depth than at the far-side wall surface.

Although the virtual flat surface VP1 corresponding to the far-side wall surface is moved to the virtual flat surface VP2 in the example of FIG. 21, as another embodiment, the virtual flat surfaces corresponding to the left and right wall surfaces and the virtual flat surfaces corresponding to the floor and the ceiling can be moved in the normal directions of the respective flat surfaces.

<2-2 Modified Example in which Some of Virtual Flat Surfaces are Removed>

Figure 22A:
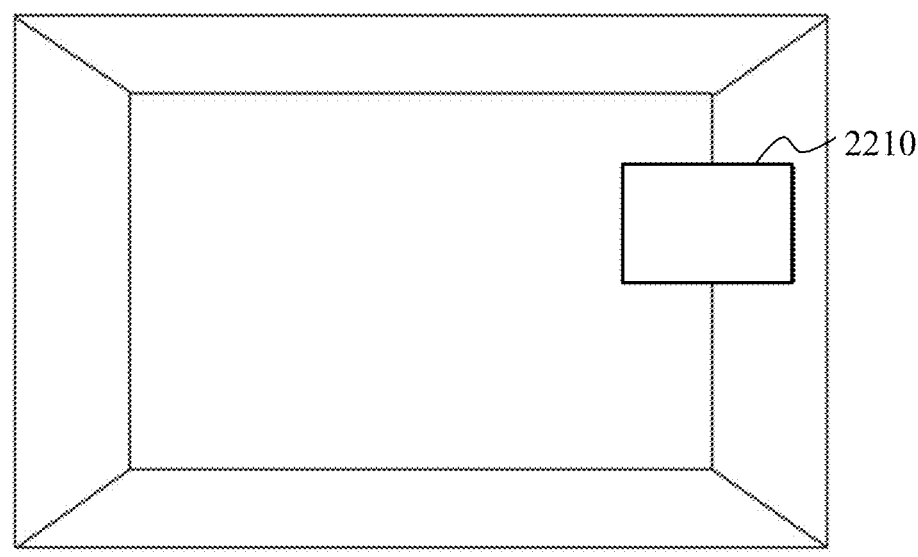
FIGS. 22A and 22B are diagrams illustrating a difference in a rendering result of a rectangular object depending on the position of the camera.
Figure 22B:
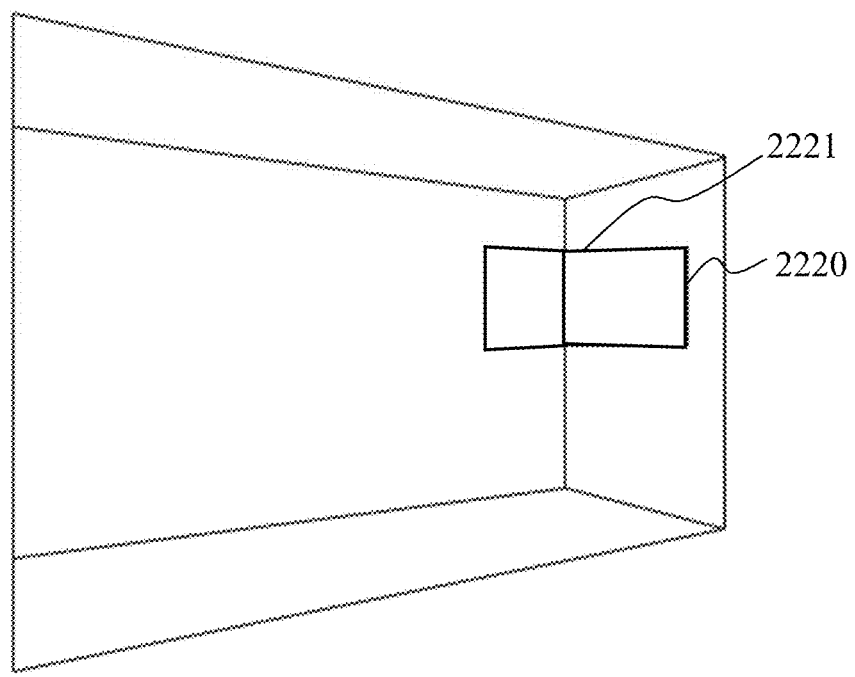

FIGS. 22A and 22B are diagrams illustrating a difference in a rendering result of a rectangular object depending on the position of the camera.

As an example, assume that a rectangular object is arranged in front of the far-side wall surface in a virtual camera direction. When the position of the camera matches the center of a cube map (not illustrated), a correct rendering result 2210 as in FIG. 22A is obtained. However, since an object appears similar to a picture drawn on a wall surface in the interior mapping of the present embodiment, when the position of the camera is changed, for example, as illustrated in FIG. 22B, a fold 2221 is formed in an image 2220 of the object at a border 2221 of virtual flat surfaces. Note that such a fold is formed also in the conventional rendering method using polygons and a baked texture.

Figure 23A:
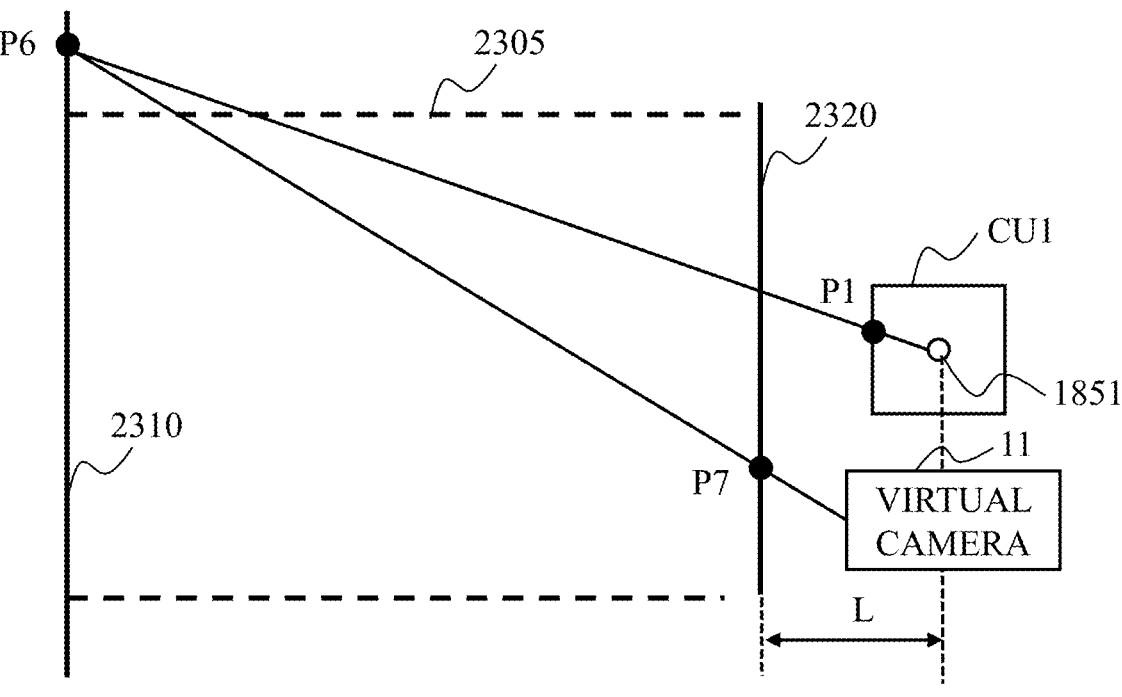
FIG. 23A is a diagram in which virtual flat surfaces 2305 corresponding to left and right wall surfaces are removed and a virtual flat surface 2310 corresponding to a far-side wall surface is extended.

FIG. 23A is a diagram in which virtual flat surfaces 2305 corresponding to the left and right wall surfaces are removed and a virtual flat surface 2310 corresponding to the far-side wall surface is extended.

A color of a point P1 in the cube map is applied to a position of a point P7 on a window 2320 via a point P6 on the virtual flat surface 2310, and is captured by the virtual camera 11.

Figure 23B:
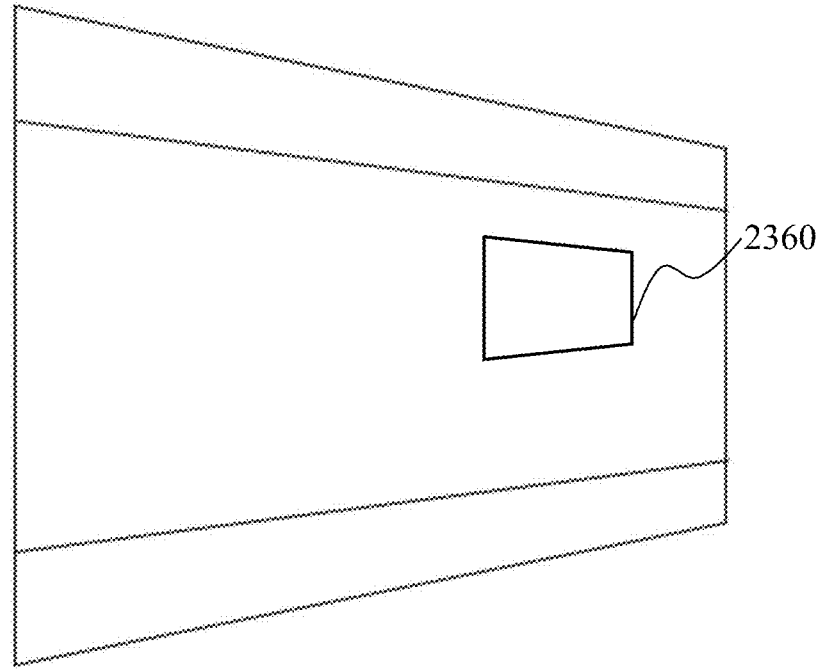
FIG. 23B is a diagram illustrating rendering 2360 of the rectangular object in which a fold 2221 of an image has disappeared.

FIG. 23B is a diagram illustrating rendering 2360 of the rectangular object in which the fold 2221 of the image has disappeared. Although an image of correct appearance cannot be obtained in this method, this method has such an advantage that elimination of the fold 2221 reduces unnaturalness.

Although the virtual flat surfaces corresponding to the left and right wall surfaces are removed in the example of FIGS. 23A and 23B, as another embodiment, the virtual flat surface corresponding to the floor may be removed or the virtual flat surface corresponding to the ceiling may be removed.

<2-3 Modified Example Using Virtual Cylindrical Surface and Virtual Spherical Surface>

Figure 24:
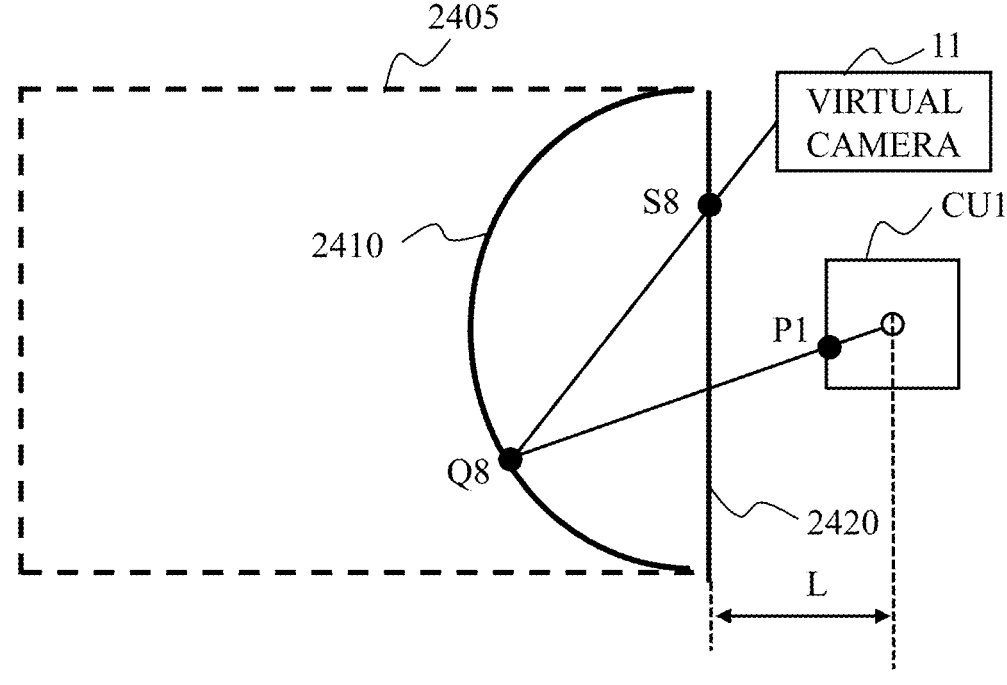
FIG. 24 illustrates an embodiment in which a virtual cylindrical surface (or virtual spherical surface) 2410 is used instead of virtual flat surfaces 2405.

FIG. 24 illustrates an embodiment in which a virtual cylindrical surface (or virtual spherical surface) 2410 is used instead of virtual flat surfaces 2405. A color of P1 on the cube map CUI is applied to a position of a point P8 on a window 2420 via a point Q8 on a virtual cylindrical surface 2410, and is captured by the virtual camera 11. An image obtained in this embodiment is distorted as a whole. However, since the fold 2221 formed at the border of the virtual flat surfaces in the case where multiple virtual flat surfaces are used is not formed in the present embodiment, the present embodiment has such an advantage that unnaturalness is reduced.

FIGS. 3C and 3D schematically illustrates as if the room R1 and the room R2 are adjacent to each other and are connected to each other by the door. However, the room R1 and the room R2 are inherently three-dimensional virtual spaces different from each other, and are not necessarily adjacent to each other.

Accordingly, in the series of embodiments described above, the image generation is performed by moving and/or rotating at least one of the first virtual space and the second virtual space and virtually arranging at least one of the first virtual space and the second virtual space such that the first virtual space and the second virtual space are connected to each other to perform image generation relating to the first virtual space and image generation relating to the second virtual space based on one virtual camera.

Meanwhile, aside from this, a method of generating an image based on two virtual cameras is also possible. In this method, a first virtual camera is used for the image generation relating to the first virtual space, and a second virtual camera is used from the image generation relating to the second virtual space. The second virtual camera is arranged in the second virtual space to be in conformity to the image generation relating to the first virtual space based on the first virtual camera.

However, a difference between the two methods is a difference of performing coordinate conversion (moving and/or rotating) on the virtual space or deriving the second virtual camera from the first virtual camera by using coordinate conversion (moving and/or rotating), and the two methods are essentially equivalent.

Each of the embodiments disclosed in the present description does not limit the invention described in the claims, and is to be handled as an example as a matter of course.

The embodiment examples are not exclusive, and can be combined as appropriate. Alternatively, some of elements in one embodiment may be replaced with elements of other embodiments.

In addition, the order of the flows in the flowcharts given as examples can be changed as long as there is no contradiction. Moreover, one flow given as an example can be executed multiple times at different timings as long as there is no contradiction. Furthermore, multiple flows can be executed simultaneously as long as there is no contradiction. Moreover, not all of the steps are essential, and some of the steps may be absent or not executed as long as there is no contradiction. Furthermore, each of the steps may be executed by an operating system or hardware. Moreover, the program may be distributed in a state where the program is stored in a non-transitory medium.

The program and the method that implement the above embodiments can be executed by a computer having a hardware configuration illustrated in FIG. 7. Specifically, the program of the embodiments may be implemented as a method executed by a computer.

The program may be stored in a storage medium 718, a ROM 702, or a RAM 703.

Each embodiment may be implemented as a device of hardware in which the program is installed.

The glass is an example of the transparent object. The room is an example of the virtual space.

The following appendices are described below for the above embodiments.

[Appendix 1] An image generation method of generating an image in which three-dimensional virtual spaces are captured from a virtual camera arranged at a virtual position of a user or in a periphery of the virtual position of the user, the image generation method including:

identifying a first virtual space to which the user belongs;

identifying one or a plurality of second virtual spaces to be an image capturing target among the virtual spaces to which the user does not belong;

generating an image in which an object present in the first virtual space is captured by the virtual camera, by a first image generation method; and generating an image corresponding to an image in which an object present in the second virtual space is captured by the virtual camera, by a second image generation method.

[Appendix 2] The image generation method according to appendix 1, wherein the second image generation method is an image generation method that consumes less calculation resources than the first image generation method, in calculation required to generate the image corresponding to the object.

[Appendix 3] The image generation method according to claim 1 or 2, wherein the second image generation method is a method of interior mapping.

[Appendix 4] The image generation method according to one of appendices 1 to 3, further including:

displaying a door that allows the user to move from the first virtual space to the second virtual space; and generating an image that appears as if the door has a certain degree of transparency by generating an image corresponding to an image in which the object present in the second virtual space is captured by the virtual camera through the door, by the second image generation method, to present that the door is passable by the user.

[Appendix 5] The image generation method according to appendix 4, further including varying a degree of transparency of a transparent object provided in the virtual space depending on an angle formed between an image capturing direction of the virtual camera and a surface of the transparent object.

[Appendix 6] The image generation method according to one of appendices 1 to 5, further including arranging a character corresponding to the user at the virtual position of the user in the virtual space.

[Appendix 7] The image generation method according to one of appendices 1 to 6, further comprising arranging the virtual camera at the virtual position of the user in the virtual space.

[Appendix 8] The image generation method according to one of appendices 1 to 6, further comprising arranging the virtual camera at a position behind the virtual position of the user in the virtual space.

[Appendix 9] The image generation method according to one of appendices 1 to 8, wherein the identifying the second virtual space includes identifying the second virtual space depending on from which one of the plurality of virtual spaces the user has entered the current virtual space.

[Appendix 10] The image generation method according to one of appendices 1 to 8, wherein the identifying the second virtual space includes identifying the virtual space to which the user is movable as the second virtual space.

[Appendix 11] The image generation method according to one of appendices 1 to 10, further including, when the user moves from the first virtual space to the second virtual space and this movement causes the second virtual space to become the new first virtual space and the first virtual space to become the new second virtual space, generating an image in which the object present in the virtual space that has become the new first virtual space is captured by the virtual camera by the first image generation method, and generating an image corresponding to an image in which the object present in the virtual space that has become the new second virtual space is captured by the virtual camera by the second image generation method.

[Appendix 12] A program that causes a computer to execute the image generation method according to one of appendices 1 to 11.

While several embodiments of the invention were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. An image generation method of generating an image in which three-dimensional virtual spaces are captured from a virtual camera arranged at a virtual position of a user or in a periphery of the virtual position of the user, the image generation method comprising:

identifying a first virtual space to which the user belongs;

identifying one or a plurality of second virtual spaces to be an image capturing target among the virtual spaces to which the user does not belong;

generating a first partial image of the image by a first image generation method, the first partial image being an image in which an object present in the first virtual space is captured by the virtual camera; and generating a second partial image of the image by a second image generation method, the second partial image corresponding to an image in which an object present in the one or the plurality of second virtual spaces is captured by the virtual camera, wherein the second image generation method is an image generation method that consumes less calculation resources than the first image generation method, in calculation required to generate the image corresponding to the object, and the second image generation method is a method of interior mapping, the image generation method further comprising:

displaying a door that allows the user to move from the first virtual space to the one or the plurality of second virtual spaces;

generating an image that appears as if the door has a certain degree of transparency by generating an image corresponding to an image in which the object present in the one or the plurality of second virtual spaces is captured by the virtual camera through the door, by the second image generation method, to present that the door is passable by the user; and when the user moves from the first virtual space to the one or the plurality of second virtual spaces and this movement causes the one or the plurality of second virtual spaces to become a new first virtual space and the first virtual space to become a new second virtual space, generating a new image including a third partial image in which the object present in the one or the plurality of second virtual spaces that has become the new first virtual space is captured by the virtual camera and a fourth partial image corresponding to an image in which the object present in the first virtual space that has become the new second virtual space is captured by the virtual camera, by generating the third partial image by the first image generation method and generating the fourth partial image by the second image generation method.

2. The image generation method according to claim 1, further comprising varying a degree of transparency of a transparent object provided in the virtual spaces depending on an angle formed between an image capturing direction of the virtual camera and a surface of the transparent object.

3. The image generation method according to claim 1, further comprising arranging a character corresponding to the user at the virtual position of the user in the virtual spaces.

4. The image generation method according to claim 1, further comprising arranging the virtual camera at the virtual position of the user in the virtual spaces.

5. The image generation method according to claim 1, further comprising arranging the virtual camera at a position behind the virtual position of the user in the virtual spaces.

6. The image generation method according to claim 1, wherein the identifying the one or the plurality of second virtual spaces includes identifying the one or the plurality of second virtual spaces depending on from which one of the virtual spaces the user has entered a current virtual space.

7. The image generation method according to claim 1, wherein the identifying the one or the plurality of second virtual spaces includes identifying a virtual space to which the user is movable as the one or the plurality of second virtual spaces.

8. A non-transitory computer-readable medium storing a program that causes a computer to execute the image generation method according to claim 1.

* * * * *